(12) United States Patent
Fenn et al.

(10) Patent No.: US 9,752,025 B2
(45) Date of Patent: Sep. 5, 2017

(54) POLYMERIZABLE COMPOSITIONS AND OPTICAL ARTICLES PREPARED THEREFROM

(71) Applicant: PPG INDUSTRIES OHIO, INC., Cleveland, OH (US)

(72) Inventors: David R. Fenn, Allison Park, PA (US); Wei Wang, Allison Park, PA (US); Charles R. Hickenboth, Cranberry Township, PA (US); Robert D. Herold, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 25 days.

(21) Appl. No.: 14/071,849

(22) Filed: Nov. 5, 2013

(65) Prior Publication Data
US 2014/0128534 A1    May 8, 2014

Related U.S. Application Data

(60) Provisional application No. 61/722,837, filed on Nov. 6, 2012.

(51) Int. Cl.
| | |
|---|---|
| *C08F 2/02* | (2006.01) |
| *C08L 33/14* | (2006.01) |
| *C08F 2/14* | (2006.01) |
| *G02B 1/04* | (2006.01) |

(52) U.S. Cl.
CPC ............... *C08L 33/14* (2013.01); *C08F 2/02* (2013.01); *C08F 2/14* (2013.01); *G02B 1/041* (2013.01)

(58) Field of Classification Search
CPC ............... C08F 2/02; C08F 2/14; G02B 1/041
See application file for complete search history.

(56) References Cited

U.S. PATENT DOCUMENTS

| | | | |
|---|---|---|---|
| 4,147,688 A | 4/1979 | Makhlouf et al. | |
| 4,180,619 A * | 12/1979 | Makhlouf | ................ C08F 2/08 428/402 |
| 4,525,499 A | 6/1985 | Hayashi et al. | |
| 4,937,173 A * | 6/1990 | Kanda | ..................... G03F 7/027 430/281.1 |
| 6,342,571 B1 * | 1/2002 | Smith et al. | .................. 526/286 |
| 6,372,840 B1 | 4/2002 | Shalati et al. | |
| 2008/0039586 A1 * | 2/2008 | Hasenwinkel et al. | ....... 525/192 |
| 2008/0227893 A1 * | 9/2008 | Tamori | .................. C08F 265/02 524/66 |
| 2010/0209697 A1 | 8/2010 | Bowles et al. | |
| 2012/0149820 A1 | 6/2012 | Fuhry et al. | |
| 2014/0128508 A1 * | 5/2014 | Wang | .................. C09D 7/1275 523/437 |

* cited by examiner

*Primary Examiner* — Mark Kaucher
(74) *Attorney, Agent, or Firm* — The Webb Law Firm

(57) ABSTRACT

Provided is a polymerizable non-aqueous dispersion, wherein the non-aqueous dispersion comprises:
   (a) a polymerizable component; and
   (b) polymeric microparticles dispersed in a continuous phase, wherein the microparticles comprise a dispersion polymerization reaction product prepared from a reaction mixture comprising an ethylenically unsaturated monomer, and an acrylic polymer stabilizer, and wherein the continuous phase is the same as or different from the polymerizable component (a).

Also provided are optical articles prepared from the polymerizable non-aqueous dispersions.

19 Claims, No Drawings

POLYMERIZABLE COMPOSITIONS AND OPTICAL ARTICLES PREPARED THEREFROM

CROSS-REFERENCE TO RELATED APPLICATIONS

This application claims the benefit of priority from U.S. Provisional Patent Application No. 61/722,837, filed Nov. 6, 2012, which is incorporated herein in its entirety.

FIELD OF THE INVENTION

The present invention relates to polymerizable compositions that are useful for preparing optical articles.

BACKGROUND OF THE INVENTION

Polymeric materials, such as plastics, have been developed as alternatives and replacements for silica based inorganic glass in applications such as optical lenses, fiber optics, windows and automotive, nautical and aviation transparencies, as well as transparent elements for electronic devices. These polymeric materials can provide advantages relative to glass, including shatter resistance, lighter weight for a given application, ease of molding, and ease of dyeing. Representative examples of such polymeric materials include, poly(methyl methacrylate), polycarbonate and poly(diethylene glycol bis(allylcarbonate)).

Improved impact resistance in the optical articles mentioned above is always being sought for safety reasons and to allow for expanded applications.

It would be desirable to develop polymerizable compositions that provide desirable optical properties to an optical article prepared therefrom, with improved impact resistance.

SUMMARY OF THE INVENTION

In accordance with the present invention, there is provided a polymerizable non-aqueous dispersion. The non-aqueous dispersion comprises:

(a) a polymerizable component as a continuous phase; and (b) polymeric microparticles dispersed in the continuous phase, wherein the microparticles comprise a dispersion polymerization reaction product prepared from a reaction mixture comprising an ethylenically unsaturated monomer, and an acrylic polymer stabilizer.

The present invention also is directed to a polymerizable non-aqueous dispersion, wherein the non-aqueous dispersion comprises:

(a) a polymerizable component; and (b) polymeric microparticles dispersed in a continuous phase, wherein the microparticles comprise a dispersion polymerization reaction product prepared from a reaction mixture comprising an ethylenically unsaturated monomer, and an acrylic polymer stabilizer, and wherein the continuous phase is different from or the same as the polymerizable component (a).

The polymerizable non-aqueous dispersion of the present invention is especially useful in the preparation of cast articles, e.g., optical articles such as case optical quality sheets and/or lenses.

DETAILED DESCRIPTION OF THE INVENTION

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), and copolymers (e.g., prepared from at least two different monomer species).

As used herein, the term "(meth)acrylate" and similar terms, such as (meth)acryloyl and (meth)acrylic acid ester, means methacrylate and acrylate. Either or both, when they exist, may be present in a composition.

As used herein, the term "thio(meth)acrylate" and similar terms, such as thio(meth)acryloyl and thio(meth)acrylic acid ester, means thiomethacrylate and thioacrylate, as above.

As used herein, recitations of "linear or branched" groups, such as linear or branched alkyl, are understood to include: a methylene group or a methyl group; groups that are linear, such as linear $C_2$-$C_{25}$ alkyl groups; and groups that are appropriately branched, such as branched $C_3$-$C_{25}$ alkyl groups.

As used herein, the term "halo" and similar terms, such as halo group, halogen, halogen group, halide, and halide group means F, Cl, Br and/or I, such as fluoro, chloro, bromo and/or iodo.

As used herein the term "hydrocarbyl" and similar terms, such as "hydrocarbyl substituent," means: linear or branched $C_1$-$C_{25}$ alkyl (e.g., linear or branched $C_1$-$C_{10}$ alkyl); linear or branched $C_2$-$C_{25}$ alkenyl (e.g., linear or branched $C_2$-$C_{10}$ alkenyl); linear or branched $C_2$-$C_{25}$ alkynyl (e.g., linear or branched $C_2$-$C_{10}$ alkynyl); $C_3$-$C_{18}$ cycloalkyl, including poly-fused-ring cycloalkyl, and polycycloalkyl (e.g., $C_3$-$C_{10}$ cycloalkyl); $C_5$-$C_8$ aryl, including polycyclic or poly-fused-ring aryl (e.g., $C_5$-$C_{10}$ aryl); and $C_6$-$C_{24}$ aralkyl (e.g., $C_5$-$C_{10}$ aralkyl).

As used herein the term "hydrocarbyl" is inclusive of "heterohydrocarbyl," which is a hydrocarbyl in which at least one carbon, but less than all of the carbons thereof, has been replaced with a heteroatom, such as, but not limited to, O, N, S, and combinations thereof. Examples of heterohydrocarbyls from which a hydrocarbyl can be selected include, but are not limited to: $C_3$-$C_{18}$ heterocycloalkyl (having at least one hetero atom in the cyclic ring), including poly-fused-ring heterocycloalkyl, and polycyclicheteroalkyl; and $C_5$-$C_{18}$ heteroaryl (having at least one hetero atom in the aromatic ring), including polycyclic or poly-fused-ring heteroaryl.

Representative alkyl groups include but are not limited to methyl, ethyl, propyl, isopropyl, butyl, isobutyl, sec-butyl, tert-butyl, pentyl, neopentyl, hexyl, heptyl, octyl, nonyl, decyl, and structural isomers thereof. Representative alkenyl groups include but are not limited to vinyl, allyl, propenyl, butenyl, pentenyl, hexenyl, heptenyl, structural isomers thereof, and related species thereof containing two or more ethylenically unsaturated groups. Representative alkynyl groups include but are not limited to ethynyl, 1-propynyl, 2-propynyl, 1-butynyl, and 2-butynyl. Representative cycloalkyl groups include but are not limited to cyclopropyl, cyclobutyl, cyclopentyl, cyclohexyl, and cyclooctyl substituents. Representative poly-fused-ring cycloalkyl groups include but are not limited to decahydronaphthalenyl, tetradecahydroanthracenyl, and tetradecahydrophenanthrenyl. Representative polycyclicalkyl groups include but are not limited to, bicyclo[2.2.1]heptanyl (norbornyl), and bicyclo

[2.2.2]octanyl. Representative heterocycloalkyl groups include but are not limited to tetrahydrofuranyl, tetrahydropyranyl and piperidinyl, including but not limited to piperidin-4-yl. Representative polycyclicheterocycloalkyl groups include but are not limited to, 7-thiabicyclo[2.2.1]heptanyl, 7-oxabicyclo[2.2.1]heptanyl, and 7-azabicyclo[2.2.1]heptanyl. Representative aryl groups include but are not limited to phenyl, biphenyl, naphthyl, anthracenyl, phenanthrenyl and triptycenyl. Representative heteroaryl groups include but are not limited to furanyl, pyranyl and pyridinyl. Representative aralkyl groups include but are not limited to benzyl, and phenethyl.

As used herein, the term "optionally substituted" with regard to groups, including but not limited to, hydrocarbyl groups, alkyl groups, cycloalkyl groups, and aryl groups, means a group, including but not limited to, a hydrocarbyl group, alkyl group, cycloalkyl group, and/or aryl group, in which at least one hydrogen thereof has been replaced or substituted with a group that is other than hydrogen, such as, but not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (including, but not limited to: alkyl; alkenyl; alkynyl; cycloalkyl, including poly-fused-ring cycloalkyl and polycycloalkyl; heterocycloalkyl; aryl, including hydroxyl substituted aryl, such as phenol, and including poly-fused-ring aryl; heteroaryl, including poly-fused-ring heteroaryl; and aralkyl groups), and amine groups, such as —N($R^{11'}$)($R^{12'}$) where $R^{11'}$ and $R^{12'}$ are each independently selected from hydrogen, hydrocarbyl and substituted hydrocarbyl.

For purposes of non-limiting illustration, the hydrocarbyl, of a substituted hydrocarbyl, can be selected from one or more of the hydrocarbyl groups described previously herein, such as a linear or branched $C_1$-$C_{25}$ alkyl group, which can be substituted with one or more of the substituting groups described previously herein, such as one or more $C_3$-$C_{12}$ cycloalkyl groups and/or one or more $C_5$-$C_{18}$ aryl groups, for example, an ethyl group substituted with a cyclohexyl group and/or a phenyl group. Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, the articles "a," "an," and "the" include plural referents unless otherwise expressly and unequivocally limited to one referent.

The terms "continuous phase" and "dispersed phase" will be understood by those skilled in the art, and are described in detail in *Pure Appl. Chem., Vol.* 83, No. 12, pp. 2229-2259 (2011), incorporated by reference herein.

Other than in the operating examples, or where otherwise indicated, all numbers expressing quantities of ingredients, reaction conditions, and so forth used in the specification and claims are to be understood as modified in all instances by the term "about."

It will be appreciated by those skilled in the art that the non-aqueous dispersions of the present invention are distinct from latex, which are aqueous dispersions. The present non-aqueous dispersions are also distinct from solution polymers, in that the non-aqueous dispersions have a dispersed phase that is different from the continuous phase, while a solution polymer has a single, homogeneous phase. A "non-aqueous dispersion" as used herein is one in which 75% or greater, such as 90% or greater, or 95% or greater, of the dispersing media is the non-aqueous polymerizable component, described below. Accordingly, a non-aqueous dispersion can still comprise some level of aqueous material, such as water.

The non-aqueous dispersions of the present invention are polymerizable compositions. The non-aqueous dispersions comprise (a) a polymerizable component as a continuous phase and (b) polymeric microparticles dispersed in the continuous phase. The polymerizable component (a) may include monomers, oligomers, and/or prepolymers with polymerizable functional groups, such as ethylenically unsaturated groups. The polymerizable components may include species with sulfur, halogens or other substituent atoms or groups, provided they do not interfere with polymerization reactions. The polymerizable component may comprise, for example, a compound containing two or more ethylenically unsaturated groups such as a diallyl ester; e.g., diallyl polycaprolactone, a diallyl carbonate such as diethylene glycol bis(allyl carbonate), and/or a diallyl phthalate such as diallyl isophthalate, diallyl terephthalate, and diallyl orthophthalate. The polymerizable component may comprise a mixture of ethylenically unsaturated groups, such as, allyl ester of an unsaturated carboxylic acid such as the allyl ester of (meth)acrylic acid. or the diallyl ester of an unsaturated dicarboxylic acid. Nonlimiting examples of polymerizable components comprising three ethylenically unsaturated groups include, diallyl maleate, diallyl itaconate, diallyl fumarate, diallyl citraconate, diallyl mesaconate and diallyl glutaconate. Other materials include (meth)acrylic monomers, acyclic non-conjugated dienes, acyclic polyvinyl ethers, allyl-(meth)acrylates vinyl-(meth)acrylates, di(meth) acrylate esters of diols, sulfur-containing di(meth)acrylate esters such as di(meth)acrylate esters of dithiols, di(meth) acrylate esters of poly(alkyleneglycol) diols, monocyclic non-aromatic dienes, polycyclic non-aromatic dienes, aromatic ring-containing dienes, diallyl esters of aromatic ring dicarboxylic acids, divinyl esters of aromatic ring dicarboxylic acids, and/or mixtures thereof.

Non-limiting examples of acyclic non-conjugated dienes can include those represented by the following general formula:

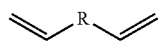

wherein R can represent C1 to C30 linear or branched divalent saturated alkylene radical, or C2 to C30 divalent organic radical including groups such as but not limited to those containing ether, thioether, ester, thioester, ketone, polysulfide, sulfone and combinations thereof. The acyclic non-conjugated dienes can be selected from 1,5-hexadiene, 1,6-heptadiene, 1,7-octadiene and mixtures thereof.

Non-limiting examples of suitable acyclic polyvinyl ethers can include those represented by the following structural formula:

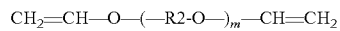

wherein R2 can be C2 to C6 n-alkylene, C3 to C6 branched alkylene group, or —[($CH_2$—)$_p$—O—]$_q$—(—CH2—)$_r$-, m can be a rational number from 0 to 10, often 2; p can be an integer from 2 to 6, q can be an integer from 1 to 5 and r can be an integer from 2 to 10.

Non-limiting examples of suitable polyvinyl ether monomers for use can include divinyl ether monomers, such as ethylene glycol divinyl ether, diethylene glycol divinyl ether, triethyleneglycol divinyl ether, and mixtures thereof.

Di(meth)acrylate esters of linear diols can include ethanediol di(meth)acrylate, 1,3-propanediol dimethacrylate, 1,2-propanediol di(meth)acrylate, 1,4-butanediol di(meth)acrylate, 1,3-butanediol di(meth)acrylate, 1,2-butanediol di(meth)acrylate, and mixtures thereof.

Di(meth)acrylate esters of dithiols can include, for example, di(meth)acrylate of 1,2-ethanedithiol including oligomers thereof, di(meth)acrylate of dimercaptodiethyl sulfide (i.e., 2,2'-thioethanedithiol di(meth)acrylate) including oligomers thereof, di(meth)acrylate of 3,6-dioxa-1,8-octanedithiol including oligomers thereof, di(meth)acrylate of 2-mercaptoethyl ether including oligomers thereof, di(meth)acrylate of 4,4'-thiodibenzenethiol, and mixtures thereof.

Further non-limiting examples of suitable dienes can include monocyclic aliphatic dienes such as those represented by the following structural formula:

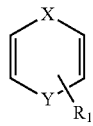

wherein X and Y each independently can represent C1-10 divalent saturated alkylene radical; or C1-5 divalent saturated alkylene radical, containing at least one element selected from the group of sulfur, oxygen and silicon in addition to the carbon and hydrogen atoms; and R1 can represent H, or C1-C10 alkyl; and

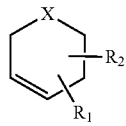

wherein X and R1 can be as defined above and R2 can represent C2-C10 alkenyl. The monocyclic aliphatic dienes can include 1,4-cyclohexadiene, 4-vinyl-1-cyclohexene, dipentene and terpinene.

Non-limiting examples of polycyclic aliphatic dienes can include 5-vinyl-2-norbornene; 2,5-norbornadiene; dicyclopentadiene and mixtures thereof.

Non-limiting examples of aromatic ring-containing dienes can include those represented by the following structural formula:

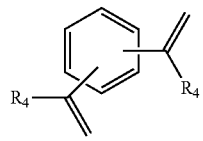

wherein R4 can represent hydrogen or methyl. Aromatic ring-containing dienes can include monomers such as diisopropenyl benzene, divinyl benzene and mixtures thereof.

Examples of diallyl esters of aromatic ring dicarboxylic acids can include but are not limited to those represented by the following structural formula:

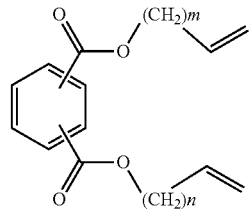

wherein m and n each independently can be an integer from 0 to 5. The diallyl esters of aromatic ring dicarboxylic acids can include o-diallyl phthalate, m-diallyl phthalate, p-diallyl phthalate and mixtures thereof.

Other polymerizable components include 5-vinyl-2-norbornene, ethylene glycol divinyl ether, diethylene glycol divinyl ether, triethylene glycol divinyl ether, butane diol divinyl ether, vinylcyclohexene, 4-vinyl-1-cyclohexene, dipentene, terpinene, dicyclopentadiene, cyclododecadiene, cyclooctadiene, 2-cyclopenten-1-yl-ether, 2,5-norbornadiene, divinylbenzene including 1,3-divinylbenzene, 1,2-divinylbenzene, and 1,4-divinylbenzene, diisopropenylbenzene including 1,3-diisopropenylbenzene, 1,2-diisopropenylbenzene, and 1,4-diisopropenylbenzene, allyl (meth)acrylate, ethanediol di(meth)acrylate, 1,3-propanediol di(meth)acrylate, 1,2-propanediol di(meth)acrylate, 1,3-butanediol di(meth)acrylate, 1,2-butanediol di(meth)acrylate, ethylene glycol di(meth)acrylate, diethylene glycol di(meth)acrylate, dimercaptodiethylsulfide di(meth)acrylate, 1,2-ethanedithiol di(meth)acrylate, and/or mixtures thereof.

Other non-limiting examples of suitable di(meth)acrylate monomers can include ethylene glycol di(meth)acrylate, 1,3-butylene glycol di(meth)acrylate, 1,4-butanediol di(meth)acrylate, 2,3-dimethyl-1,3-propanediol di(meth)acrylate, 1,6-hexanediol di(meth)acrylate, propylene glycol di(meth)acrylate, dipropylene glycol di(meth)acrylate, tripropylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxylated neopentyl glycol di(meth)acrylate, pentanediol di(meth)acrylate, cyclohexane dimethanol di(meth)acrylate, and ethoxylated Bisphenol A di(meth)acrylate.

In particular embodiments the polymerizable component may include monomers, oligomers, and/or prepolymers one or more of the following: allyl diglycol carbonate; poly(meth)acrylate precursors; polycarbonate precursors; polyurethane precursors; polyureaurethane precursors; polythiourethane precursors; and polyamide precursors. By "precursors" is meant functional compounds or monomers used to prepare the resinous material; for example, polyurethane precursors would include polyols and polyisocyanates. The polymerizable compositions of the present invention can optionally include, in some embodiments, one or more monomers having a single ethylenically unsaturated radically polymerizable group. Examples of monomers having a single ethylenically unsaturated radically polymerizable group that can optionally be present in the polymerizable component (a) include, but are not limited to: acrylic acid; methacrylic acid; esters of acrylic acid such as methyl or ethyl acrylate and 2-hydroxyethyl acrylate; esters of methacrylic acid, such as methyl or ethyl methacrylate, phenoxyethyl methacrylate, isobornyl methacrylate, cyclohexyl methacrylate and 2-hydroxyethyl methacrylate; allyl esters, e.g., allyl benzoate and allyl functional polycaprolactones; allyl carbonates, e.g., phenyl allyl carbonate; vinyl esters such as vinyl acetate; styrene; and vinyl chloride. In some embodiments, the monoethylenically unsaturated monomers include, methyl methacrylate, isobornyl methacrylate, phenoxyethyl methacrylate, cyclohexyl methacrylate, styrene and mixtures thereof. The monoethylenically unsaturated monomer(s), when used, is typically present in an amount of from 0.1 percent by weight to 60 percent by weight, based on the total monomer weight of the polymerizable composition, such as from 3 percent by weight to 55 percent by weight, or from 20 to 45 percent by weight, based on the total monomer weight of the polymerizable composition.

In particular embodiments of the present invention, the polymerizable component (a) may comprise at least one first (meth)acrylate functional monomer represented by the following Formula (I),

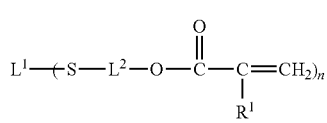

Formula (I)

With reference to Formula (I), $L^1$ is selected from at least one of (i) a multivalent optionally substituted hydrocarbyl group optionally interrupted with at least one of —C(O)—, —S—, —O— and combinations thereof, and (ii) a divalent linking group represented by the following Formula (A),

Formula (A)

With reference to Formula (A), Y is O or S. With further reference to Formula (I): $L^2$ is independently for each subscript-n, a divalent optionally substituted hydrocarbyl group optionally interrupted with at least one of —O— and —S—; $R^1$ is independently selected, for each subscript-n, from hydrogen and methyl; and subscript-n is from 2 to 6.

The polymerizable component may additionally or alternatively comprise at least one thio(meth)acrylate functional monomer represented by the following Formula (II).

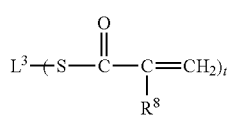

(II)

With reference to Formula (II): $L^3$ is a multivalent optionally substituted hydrocarbyl group optionally interrupted with at least one of —C(O)—, —S—, —O— and combinations thereof; $R^8$ is independently selected for each t from hydrogen and methyl; and t is from 2 to 6. In addition to including at least one thio(meth)acrylate monomer represented by Formula (II), the polymerizable component may also comprise at least one (meth)acrylate functional monomer represented by the following Formula (III).

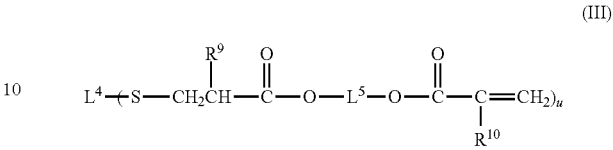

(III)

With reference to Formula (III): $L^4$ is a multivalent optionally substituted hydrocarbyl group optionally interrupted with at least one of —C(O)—, —S—, —O— and combinations thereof; $L^5$ is independently for each u a divalent optionally substituted hydrocarbyl group; $R^9$ and $R^{10}$ are each independently selected for each u from hydrogen and methyl; and u is from 2 to 6.

The polymerizable component (a) may additionally or alternatively comprise at least one (meth)acrylate functional monomer represented by the following Formula (IV),

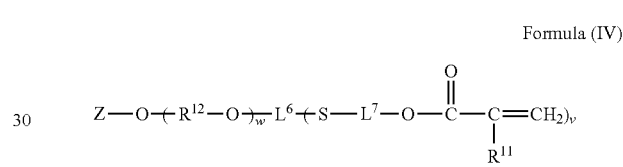

Formula (IV)

With reference to Formula (IV): $L^6$ is selected from a multivalent optionally substituted hydrocarbyl group; $L^7$ is independently for each v a divalent optionally substituted hydrocarbyl group optionally interrupted with at least one of —O— and —S—,
$R^{11}$ is independently selected for each v from hydrogen and methyl,
v is from 2 to 6; and $R^{12}$ is independently for each w divalent optionally substituted hydrocarbyl. With further reference to Formula (IV), w is 0 to 10, and Z is selected from hydrogen or a group represented by the following Formula (V),

Formula (V)

With reference to Formula (V), $R^{13}$ is hydrogen or methyl.

The monomers of the polymerizable component (a) as described herein, including monomers represented by Formula (I), Formula (II), Formula (III), Formula (IV) and related monomers, in each case optionally further include one or more coproducts that include one or more radically polymerizable ethylenically unsaturated groups, such as, but not limited to oligomers that include one or more radically polymerizable ethylenically unsaturated groups, resulting from the synthesis of such monomers. The coproducts, such as oligomeric coproducts, can optionally also be present in the polymerizable compositions of the present invention.

The monomers of the polymerizable component (a) as described herein, including monomers represented by Formula (I), Formula (II), Formula (III), Formula (IV) and related monomers, in each case optionally further include one or more coproducts that include one or more radically polymerizable ethylenically unsaturated groups, such as, but not limited to oligomers that include one or more radically polymerizable ethylenically unsaturated groups, resulting from the synthesis of such monomers.

With reference to Formula (I) shown above, and with some embodiments, $L^1$ can be selected from multivalent linear or branched optionally substituted $C_1$-$C_{25}$ alkyl, multivalent optionally substituted $C_3$-$C_{12}$ cycloalkyl, multivalent optionally substituted aryl, and combinations thereof optionally interrupted with at least one of —C(O)—, —S—, —O— and combinations thereof. Each group from which $L^1$ can be selected can itself optionally be interrupted with at least one of —C(O)—, —S—, —O— and combinations thereof. Additionally or alternatively, and as discussed previously herein, when $L^1$ is selected from, or composed of, two or more groups, such as a multivalent linear or branched optionally substituted $C_1$-$C_{25}$ alkyl group and a multivalent optionally substituted $C_3$-$C_{12}$ cycloalkyl group, the multivalent groups can be interrupted with at least one of —C(O)—, —S—, —O— and combinations thereof.

The divalent group $L^2$ of Formula (I), with some embodiments, can be selected from divalent optionally substituted linear or branched $C_1$-$C_{25}$ alkyl, divalent optionally substituted $C_3$-$C_{12}$ cycloalkyl, divalent optionally substituted aryl, and combinations thereof optionally interrupted with at least one of —O— and —S—.

According to some embodiments, $L^1$ of Formula (I) is selected from multivalent linear or branched $C_1$-$C_{10}$ alkyl optionally interrupted with at least one of —C(O)—, —S— and —O—. In accordance with some additional embodiments, $L^2$ of Formula (I) is independently for each n selected from divalent linear or branched $C_1$-$C_{10}$ alkyl optionally interrupted with at least one —O—. Examples of multivalent and divalent alkyl groups from which $L^1$ and $L^2$ can each be independently selected, include, but are not limited to, methyl, ethyl, propyl, butyl, pentyl, hexyl, heptyl, octyl, nonyl, and decyl, including structural isomers thereof.

The multivalent $L^1$ linking group of the first (meth) acrylate functional monomer represented by Formula (I), with some embodiments, is selected from multivalent linear or branched $C_1$-$C_{10}$ alkyl interrupted with at least one —S— group, and n of Formula (I) is 2 or 3. The multivalent linear or branched $C_1$-$C_{10}$ alkyl groups from which $L^1$ can be selected include, but are not limited to, those recited previously herein.

The multivalent $L^1$ linking group of Formula (I), with some embodiments, is a divalent linking group, n is 2, and $L^1$ is represented by the following Formula (B),

—(R2-S)$_p$—R$^3$—      Formula (B)

With reference to Formula (B), $R^2$ for each p is independently selected from divalent linear or branched optionally substituted $C_1$-$C_{10}$ alkyl, and/or divalent optionally substituted $C_3$-$C_{12}$cycloalkyl. With further reference to Formula (B), $R^3$ is selected from divalent linear or branched optionally substituted $C_1$-$C_{10}$ alkyl, and/or divalent optionally substituted $C_3$-$C_{12}$ cycloalkyl, and p is 0 to 10. The divalent alkyl groups from which $R^2$ and $R^3$ can each be independently selected include, but are not limited to, those described previously herein with regard to $L^1$.

Non-limiting examples of divalent optionally substituted linear or branched alkyl groups from which $R^2$ for each p and $R^3$ can each be independently selected include, but are not limited to: —CH$_2$—; —CH$_2$CH$_2$—; —CH(Ph)CH$_2$—, where Ph represents optionally substituted phenyl (—C$_6$H$_5$); —(CH$_2$)$_3$—; —CH(CH$_3$)CH$_2$—; —(CH$_2$)$_4$—; —CH(CH$_3$) CH$_2$CH$_2$—; —CH$_2$CH(CH$_3$)CH$_2$—; —C(CH$_3$)$_2$CH$_2$—; —(CH$_2$)$_5$—; —CH(CH$_3$)CH$_2$CH$_2$CH$_2$—; —CH$_2$CH(CH$_3$) CH$_2$CH$_2$—; —C(CH$_3$)$_2$CH$_2$CH$_2$—; and —CH$_2$C(CH$_3$)$_2$ CH$_2$—.

Non-limiting examples of divalent optionally substituted cycloalkyl groups from which $R^2$ for each p and $R^3$ can each be independently selected include, but are not limited to: cyclopropan-1,1-diyl; cyclopropan-1,2-diyl; cyclobutan-1,1-diyl; cyclobutan-1,2-diyl; cyclobutan-1,3-diyl; cyclopentan-1,1-diyl; cyclopentan-1,2-diyl; cyclopentan-1,3-diyl; cyclohexan-1,1-diyl; cyclohexan-1,2-diyl; cyclohexan-1,3-diyl; and cyclohexan-1,4-diyl.

With the preceding non-limiting examples of divalent optionally substituted linear or branched alkyl groups and divalent optionally substituted cycloalkyl groups from which $R^2$ for each p and $R^3$ can each be independently selected, one or more hydrogens thereof can each be optionally and independently substituted or replaced with a group other than hydrogen including, but not limited to, those groups as described previously herein with regard to the term "optionally substituted."

The divalent group $L^2$ of Formula (I) can, in accordance with some embodiments, be represented by the following Formula (C),

—(R$^4$—O)$_q$—R$^5$—      Formula (C)

With reference to Formula (C): $R^4$ for each q is independently selected from linear or branched optionally substituted $C_1$-$C_{10}$ alkyl, and optionally substituted $C_3$-$C_{12}$ cycloalkyl; $R^5$ is selected from linear or branched optionally substituted $C_1$-$C_{10}$ alkyl, and optionally substituted $C_3$-$C_{12}$ cycloalkyl; and q is 0 to 10.

Non-limiting examples of divalent optionally substituted divalent linear or branched alkyl groups from which $R^4$ for each q and $R^5$ can each be independently selected include, but are not limited to, those described previously herein with regard to $R^2$ and $R^3$, in which one or more hydrogens thereof can each be optionally and independently substituted or replaced with a group other than hydrogen including, but not limited to, those groups as described previously herein with regard to the term "optionally substituted." Non-limiting examples of divalent optionally substituted cycloalkyl groups from which $R^4$ for each q and $R^5$ can each be independently selected include, but are not limited to those described previously herein with regard to $R^2$ and $R^3$, in which one or more hydrogens thereof can each be optionally and independently replaced with a group other than hydrogen including, but not limited to, those groups as described previously herein with regard to the term "optionally substituted."

In accordance with some embodiments, n of Formula (I) is 2, $L^1$ is represented by Formula (B) and $L^2$ is represented by Formula (C), in which case the first (meth)acrylate functional monomer can be represented by the following Formula (Ia):

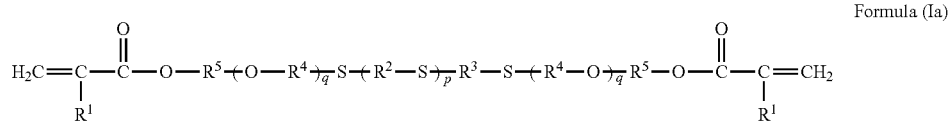

Formula (Ia)

$$H_2C=\underset{R^1}{C}-\overset{O}{\underset{\|}{C}}-O-R^5-(O-R^4)_q-S-(R^2-S)_p-R^3-S-(R^4-O)_q-R^5-O-\overset{O}{\underset{\|}{C}}-\underset{R^1}{C}=CH_2$$

With reference to Formula (Ia), $R^1$, $R^2$, $R^3$, R4, $R^5$, p, and q are each independently as described previously herein. The first (meth)acrylate functional monomer represented by Formula (Ia) includes at least two sulfide linkages (—S—).

With further reference to Formula (Ia), and with some embodiments of the present invention: p is 1; each q is independently 0 to 10, provided that at least one q is at least 1; $R^2$, $R^3$, $R^4$ and $R^5$ are each divalent ethyl, such as ethan-1,2-diyl; and each $R^1$ is independently hydrogen or methyl.

With additional reference to Formula (Ia), and in accordance with some embodiments: p is 1; each q is 0; and $R^2$, $R^3$ and $R^5$ are each selected from divalent ethyl, such as ethan-1,2-diyl, in which case the first (meth)acrylate functional monomer can be represented by the following Formula (Ib):

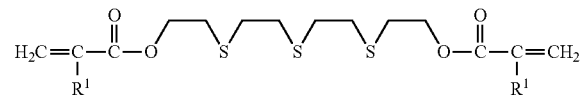

Formula (Ib)

With reference to Formula (Ib), each $R^1$ is independently selected from hydrogen and methyl, as described previously herein.

With some embodiments, $L^1$ of Formula (I) is selected from a trivalent group represented by the following Formula $L^1$ (a),

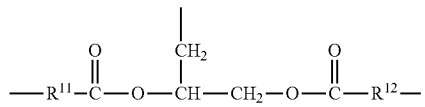

Formula $L^1$(a)

With reference to Formula L(a), and with some embodiments, $R^{11}$ and $R^{12}$ are each independently selected from: divalent linear or branched alkyl, such as divalent linear or branched $C_1$-$C_{25}$ alkyl, or divalent linear or branched $C_1$-$C_{10}$ alkyl, or divalent linear or branched $C_1$-$C_4$ alkyl, or divalent $C_1$-$C_2$ alkyl; divalent cyclic alkyl, such as divalent $C_5$-$C_8$ cyclic alkyl; divalent phenyl, including linear or branched $C_1$-$C_9$ alkyl substituted divalent phenyl. When $L^1$ is selected from a trivalent group represented by Formula $L^1$(a), n of Formula (I) is 3.

When $L^1$ is selected from a trivalent group represented by Formula $L^1$(a), the first (meth)acrylate functional monomer represented by Formula (I) can be represented by the following Formula (Ic):

With reference to Formula (Ic), each $R^1$ and each $L^2$ are each independently as described previously herein.

The first (meth)acrylate functional monomer as represented by Formula (I) can be prepared by art-recognized methods. With some embodiments, and for purposes of non-limiting illustration, the first (meth)acrylate functional monomer represented by Formula (I) can be prepared by reaction of one mole of a polythiol having n thiol groups (—SH) and at least n moles of one or more oxirane functional materials (and/or one or more cyclic ethers), which results in the formation of a hydroxyl functional intermediate having n hydroxyl groups, where n, in each case, is as described with reference to Formula (I). Examples of oxirane functional materials include, but are not limited to, alkylene oxides, such as ethylene oxide and propylene oxide. Alternatively, the polythiol can be reacted with a 2-halo-1-hydroxy-alkane, such as 2-chloroethanol, in accordance with art-recognized methods. Further alternatively, the polythiol can be reacted with a 1,2-alkylene carbonate, such as ethylene carbonate, in accordance with art-recognized methods. Reaction of the polythiol with oxirane functional material, or 2-halo-1-hydroxy-alkane, or 1,2-alkylene carbonate, results in the formation of a hydroxyl functional intermediate.

The hydroxyl functional intermediate can then be reacted with a (meth)acrylic acid ester with the concurrent removal of alcohol, thereby resulting in formation of a first (meth)acrylate functional monomer represented by Formula (I). Alternatively, the hydroxyl functional intermediate can be reacted with a (meth)acryloyl halide, such as (meth)acryloyl chloride, with subsequent work-up procedures to remove the resulting hydrogen halide and/or salt thereof. Further alternatively, the hydroxyl functional intermediate can be reacted with (meth)acrylic anhydride, in accordance with art-recognized methods. The hydroxyl functional intermediate also can be reacted with (meth)acrylic acid with concurrent removal of water, thereby resulting in formation of a first (meth)acrylate functional monomer represented by Formula (I).

When $L^1$ is represented by Formula (A), and for purposes of non-limiting illustration, the first (meth)acrylate functional monomer represented by Formula (I) can be prepared by reaction of a carbonic dihalide (when Y of Formula A is O) or a carbonothioic dihalide (when Y of Formula A is S) with two moles of a thiol functional material represented by the following Formula (F):

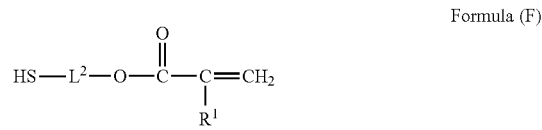

Formula (F)

With reference to Formula (F). $L^2$ and $R^1$ are each as described previously herein with regard to Formula (I).

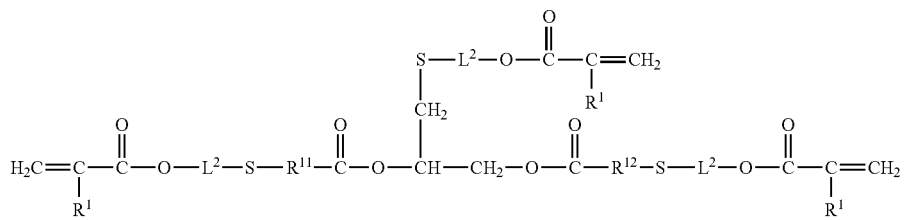

Formula (Ic)

Alternatively, when $L^1$ is represented by Formula (A), and for purposes of further non-limiting illustration, the first (meth)acrylate functional monomer represented by Formula (I) can be prepared by reaction of N,N-carbonyldiimidazole (when Y of Formula A is O) or a N,N-thiocarbonyldiimidazole (when Y of Formula A is S) with two moles of a thiol functional material represented by Formula (F).

With reference to Formula (B), $R^2$ for each p, and $R^3$ are each independently as described previously herein, and p is 0 to 10.

When, as with some embodiments, $L^1$ is represented by Formula (D), $L^2$, with some embodiments, is represented by Formula (B), and n is 2, the first (meth)acrylate functional monomer represented by Formula (I) can be represented by the following Formula (Id),

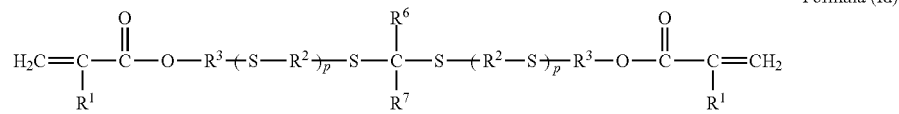

Formula (Id)

With reference to Formula (I), and in accordance with some embodiments, n is 2, $L^1$ is selected from a divalent linking group represented by Formula (A), and $L^2$ is represented by the following Formula (B),

—($R^2$—S)$_p$—$R^3$—      Formula (B)

With reference to Formula (B), $R^2$ for each p, and $R^3$ are each independently as described previously herein, and p is 0 to 10.

When n is 2, $L^1$ is represented by Formula (A) and $L^2$ is represented by Formula (B), and for purposes of non-limiting illustration, the first (meth)acrylate functional monomer represented by Formula (I) can be prepared by reaction of a carbonic dihalide (when Y of Formula A is O) or a carbonothioic dihalide (when Y of Formula A is S) with a dithiol, such as dimercaptodiethylsulfide (which can also be equivalently referred to as bis(2-mercaptoethyl)sulfide), which results in the formation of an intermediate dithiol having a —C(O)— or —C(S)— linkage in the backbone thereof. The intermediate dithiol is then reacted with two moles of an oxirane functional material, such as ethylene oxide, which results in the formation of di-hydroxy functional intermediate. The di-hydroxy functional intermediate can then be reacted with two moles of a (meth)acrylate with the concurrent removal of a 2 moles of alcohol, which results in formation of a first (meth)acrylate functional monomer. In the preceding general synthetic procedure, the carbonic dihalide can be replaced with N,N-carbonyldiimidazole (when Y of Formula A is O), and/or the carbonothioic dihalide can be replaced with N,N-thiocarbonyldiimidazole (when Y of Formula A is S). With further reference to the preceding general synthetic procedure, the (meth)acrylate reactant can be replaced with a (meth)acryloyl halide, such as (meth)acryloyl chloride.

With reference to Formula (I), and with some embodiments, n is 2, and $L^1$ is selected from, a divalent linking group represented by the following Formula (D), —C($R^6$)($R^7$)—      Formula (D)

With reference to Formula (D), $R^6$ and $R^7$ are each independently selected from hydrogen, linear or branched optionally substituted $C_1$-$C_{10}$ alkyl, optionally substituted $C_3$-$C_{12}$ cycloalkyl, and optionally substituted aryl. Alternatively, $R^6$ and $R^7$ together form a $C_4$-$C_{12}$ optionally substituted cycloalkyl.

With further reference to Formula (I), with some embodiments, when n is 2 and $L^1$ is represented by Formula (D), $L^2$ is represented by the following Formula (B),

—($R^2$—S)$_p$—$R^3$—      Formula (B)

With reference to Formula (Id), $R^1$, $R^2$, $R^3$, $R^6$, $R^7$, and each p are each independently as described previously herein. With further reference to Formula (Id), and with some embodiments of the present invention, each $R^1$ is independently selected from hydrogen and methyl, $R^6$ and $R^7$ are each independently selected from hydrogen and methyl, $R^2$ and $R^3$ are in each case ethan-1,2-diyl, and each p is independently 1 or 2.

With reference to Formula (I), when $L^1$ is represented by Formula (D), $L^2$ is represented by Formula (B), and n is 2, the first (meth)acrylate monomer of the polymerizable compositions of the present invention can be prepared by art-recognized methods. For purposes of non-limiting illustration, a first (meth)acrylate functional monomer represented by Formula (Id) can be prepared in accordance with the following representative Scheme-(A).

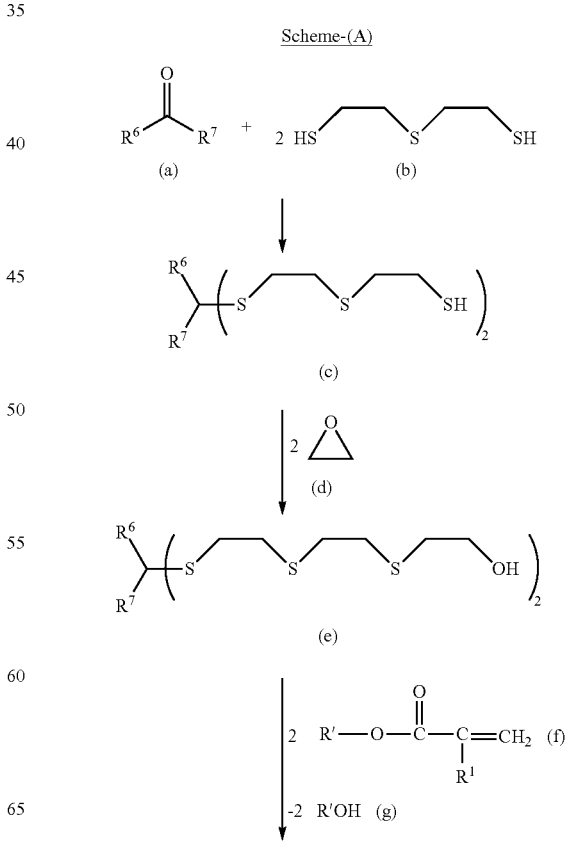

Scheme-(A)

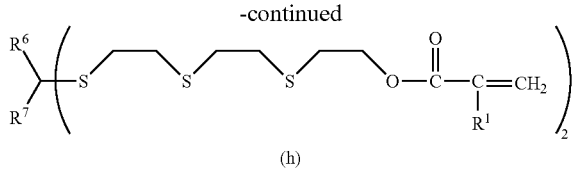

(h)

With reference to Scheme-(A), $R^1$, $R^6$, and $R^7$ are each as described previously herein with reference to, for example, Formula (Id), and R' is a monovalent hydrocarbyl, such as linear or branched $C_1$-$C_{25}$ alkyl, or $C_3$-$C_{12}$ cycloalkyl. With further reference to Scheme-(A), 1 mole of an aldehyde or ketone (a) is reacted with 2 moles of a di-thiol, such as dimercaptodiethylsulfide (b) (which can also be equivalently referred to as bis(2-mercaptoethyl)sulfide), which results in formation of a thiol functional adduct (c). Thiol functional adduct (c) is reacted with 2 moles of an oxirane functional material, such a ethylene oxide (d), which results in formation of a hydroxy functional intermediate (e). Hydroxy functional intermediate (e) is reacted with 2 moles of a (meth)acrylate (f) with the concurrent removal of 2 moles of alcohol (g), which results in formation of a first (meth)acrylate functional monomer (h), which can be used in the polymerizable compositions of the present invention.

With further reference to Scheme-(A), the formation of thiol functional adduct (c) can be accompanied by the concurrent formation of coproducts, such as oligomeric coproducts. The formation of oligomeric coproducts can be minimized by adjusting the relative molar amounts of the aldehyde/ketone (a) and dithiol (b). For purposes of non-limiting illustration, a molar ratio of dithiol (b) to aldehyde/ketone (a) of at least 4 to 1 typically results in minimal formation of oligomeric coproduct.

With additional reference to Scheme-(A), the (meth) acrylate (f) can be replaced with a (meth)acryloyl halide, such as (meth)acryloyl chloride, in which case 2 moles of hydrogen halide, such as hydrogen chloride, would be generated, rather than 2 moles of alcohol (g). The first (meth)acrylate monomer (h) would be separated from the hydrogen halide in accordance with art-recognized work-up procedures.

With further additional reference to Scheme-(A), the aldehyde or ketone (a) can be replaced with an acetal or a ketal (a-1) represented by the following Formula (a-1).

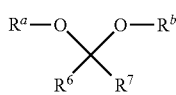

Formula (a-1)

With reference to Formula (a-1), $R^6$ and $R^7$ are each as described previously herein, and $R^a$ and $R^b$ are each independently selected from linear or branched optionally substituted $C_1$-$C_{25}$ alkyl, optionally substituted $C_3$-$C_{12}$-cycloalkyl, and optionally substituted aryl. The aldehyde or ketone (a) of Scheme-(A) can, with some embodiments, be replaced with an equimolar amount of acetal/ketal represented by Formula (a-1). For purposes of non-limiting illustration, with some embodiments, the acetal/ketal represented by Formula (a-1) is acetone dimethylketal.

With further reference to Formula (I) and in accordance with some embodiments, n is 2, and $L^1$ is a divalent linking group represented by Formula (G-1) as described in further detail below. The divalent linking group $L^8$ of Formula (G-1) is, with some embodiments, a residue of a hydrocarbyl group having two non-conjugated carbon-carbon double bonds. With some embodiments, $L^8$ of Formula (G-1) is a residue of vinyl-cyclohexene, and $L^8$ is represented by Formula (G-2) as described in further detail below, and $L^1$ of Formula (I) is represented by Formula (G-3) as described in further detail below.

The polymerizable component (a) can, in addition to the first (meth)acrylate functional monomer represented by Formula (I), further include at least one thio(meth)acrylate functional monomer represented by the following Formula (II),

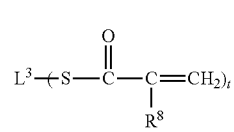

(II)

With reference to Formula (II), and as discussed previously herein, $L^3$ is a multivalent optionally substituted hydrocarbyl group optionally interrupted with at least one of —C(O)—, —S—, —O— and combinations thereof. Each $R^8$ group of Formula (II) is independently selected for each t from hydrogen and methyl, and t is from 2 to 6.

The groups from which $L^1$ of the thio(meth)acrylate functional monomer represented by Formula (II) can be selected include, but are not limited to, those groups described previously herein with regard to $L^1$ of Formula (I). With some embodiments of the present invention, the multivalent $L^3$ group of Formula (II) is selected from multivalent linear or branched optionally substituted $C_1$-$C_{25}$ alkyl, multivalent optionally substituted $C_3$-$C_{12}$cycloalkyl, multivalent optionally substituted aryl, and combinations thereof optionally interrupted with at least one of —C(O)—, —S—, —O— and combinations thereof.

With some embodiments, t is 2, and $L^3$ of Formula (II) is represented by Formula (B), as described previously herein, and the thio(meth)acrylate monomer can be represented by the following Formula (IIa).

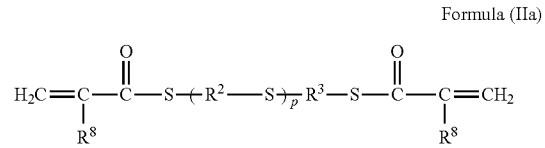

Formula (IIa)

With reference to Formula (IIa), $R^2$, $R^3$, $R^8$ and p are each independently as described previously herein.

With some embodiments of the present invention, and with further reference to Formula (IIa), p is 1, and $R^2$ and $R^3$ are each divalent ethyl, such as ethan-1,2-diyl, in which case the thio(meth)acrylate functional monomer represented by Formula (IIa) can be represented by the following Formula (IIb).

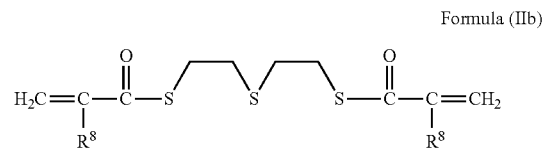

Formula (IIb)

With reference to Formula (IIb), each $R^8$ is independently selected from hydrogen and methyl, as described previously herein.

Thio(meth)acrylate monomers represented by Formula (II) can be prepared by art-recognized methods. For purposes of non-limiting illustration, a polythiol, such as such as dimercaptodiethylsulfide, or a salt of a polythiol, such as such as dimercaptodiethylsulfide disodium salt, can be reacted with a (meth)acryloyl halide, such as (meth)acryloyl chloride, which results in the formation of a thio(meth) acrylate functional monomer represented by Formula (II), or, for example, Formula (IIa).

With further reference to Formula (II) and with some embodiments, t is 2, and $L^3$ is represented by the following Formula (G-1)

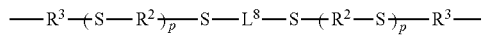

Formula (G-1)

With reference to Formula (G-1), $R^2$, $R^3$ and p are in each case as independently described previously herein with regard to Formula (B). With further reference to Formula (G-1), $L^8$ is a divalent optionally substituted hydrocarbyl. With some embodiments, $L^8$ is selected from divalent linear or branched optionally substituted $C_1$-$C_{25}$ alkyl, divalent optionally substituted $C_3$-$C_{12}$ cycloalkyl, divalent optionally substituted aryl, and combinations thereof.

The divalent group $L^8$ of Formula (G-1) with some embodiments is a residue of an optionally substituted hydrocarbyl having two non-conjugated carbon-carbon double bonds, such as a linear or branched optionally substituted $C_1$-$C_{25}$ alkyl having two non-conjugate double bonds, and/or optionally substituted $C_3$-$C_{12}$ cycloalkyl having two non-conjugated double bonds. With some embodiments, $L^8$ of Formula (G-1) is a residue of vinyl-cyclohexene, such as 4-vinyl-1-cyclohexene or 3-vinyl-1-cyclohexene. In accordance with some non-limiting embodiments, $L^8$ of Formula (G-1) is a residue of vinyl-cyclohexene, and is represented by the Following (G-2).

Formula (G-2)

In accordance with some embodiments, and with reference to Formula (II), t is 2, and $L^3$ is represented by Formula (G-1), in which $L^8$ is a residue of vinyl-cyclohexene and is represented by Formula (G-2), in which case $L^3$ is more particularly represented by the following Formula (G-3).

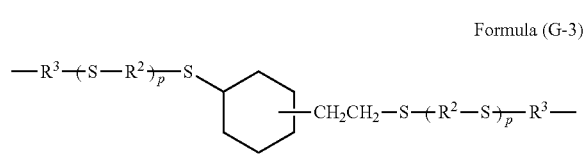

Formula (G-3)

With reference to Formula (G-3), and in accordance with some embodiments, the two groups bonded to the cyclohexane ring are ortho, meta or pare relative to each other, and are not bonded to the same carbon of the cyclohexane ring. With further reference to Formula (G-3), $R^2$, $R^3$ and p independently in each case are described previously herein with regard to Formula (B).

Further, when t is 2 and $L^3$ is represented by Formula (G-3) in which the two groups bonded to the cyclohexane ring are para relative to each other, the thio(meth)acrylate monomer represented by Formula (II) can be more particularly represented by the following Formula (IIc).

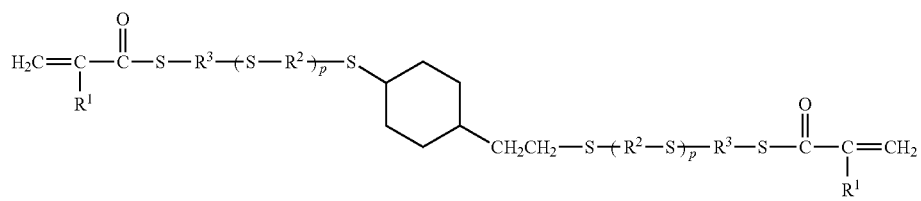

Formula (IIc)

In accordance with some embodiments, when t is 2 and $L^3$ is represented by Formula (G-3) in which the two groups bonded to the cyclohexane ring are meta relative to each other, the thio(meth)acrylate monomer represented by Formula (II) can be more particularly represented by the following Formula (IId).

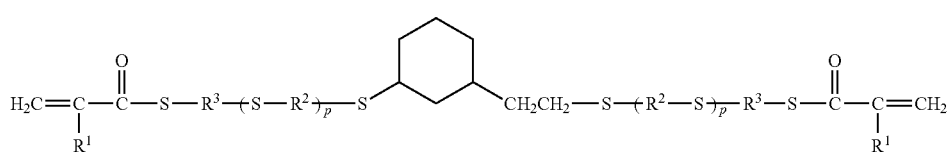

Formula (IId)

With reference to Formulas (IIc) and (IId), each $R^1$ is independently selected from hydrogen and methyl, and $R^2$, $R^3$ and p are each independently as described previously herein with regard to Formula (B).

With additional reference to Formulas (IIc) and (IId), and with some embodiments, $R^2$ and $R^3$ are each ethan-1,2-diyl, and each p is 1, in which case the thio(meth)acrylate monomers represented by Formulas (IIc) and (IId) can be represented by the following Formulas (IIe) and (IIf), respectively and azobis(2,4-dimethylvaleronitrile). Additional non-limiting examples of azo type radical initiators are described in further detail herein with regard to the synthesis of monomers represented by Formula (IV). The free radical initiator is typically present in an amount at least sufficient to initiate reaction between the thiol compound and the compound

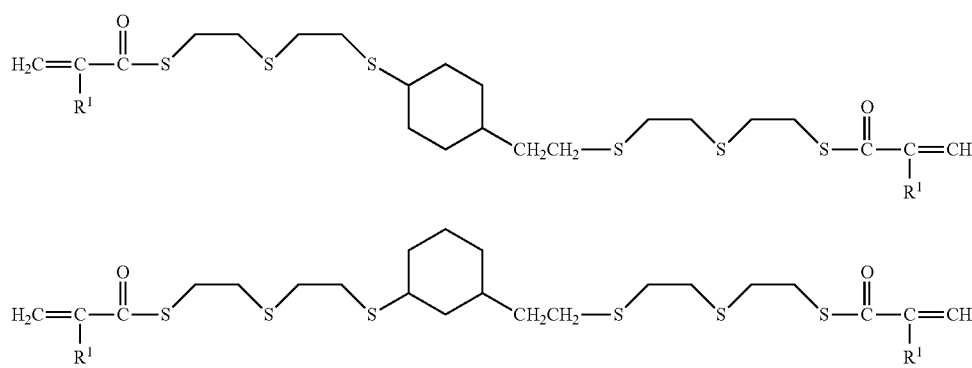

Formula (IIe)

Formula (IIf)

Thio(meth)acrylate functional monomers similar to those represented by Formulas (IIc) and (IId) can be prepared by art-recognized methods. For purposes of non-limiting illustration, 2 moles of a dithiol, such as dimercaptodiethylsulfide, are reacted with one mole of vinyl-cyclohexene, such as 4-vinyl-1-cyclohexene, under art-recognized thiol-ene reaction conditions, which results in a thiol-functional intermediate. The thiol-functional intermediate(s) is/are then reacted with 2 moles of a (meth)acryloyl halide, such as (meth)acryloyl chloride, resulting in formation of a thio (meth)acrylate functional monomer represented by Formula (IIe), or Formula (IIf), or mixtures thereof.

For purposes of non-limiting illustration, thiol-ene reactions generally involve the reaction of a material having one or more thiol groups, such as a dithiol, with a material having one or more carbon-carbon double bonds, such as a vinyl compound, a (meth)acrylate, and/or an allyl compound. With some embodiments, a material having one or more carbon-carbon triple bonds is used, as described in further detail herein with regard to the synthesis of monomers represented by Formula (IV). For free radical initiated thiol-ene reactions, reaction between the material having one or more thiol groups and the material having one or carbon-carbon double bonds is typically carried out in the presence of a free radical initiator, such as peroxide type and/or azo type free radical initiators. Examples of peroxide free radical initiators include, but are not limited to: peroxymonocarbonate esters, such as tertiarybutylperoxy 2-ethylhexyl carbonate and tertiarybutylperoxy isopropyl carbonate; peroxyketals, such as 1,1-di-(t-butyl peroxy)-3,3,5-trimethylcyclohexane; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. Examples of suitable azo type radical initiators include, but are not limited to, azobis(organonitrile) compounds, such as azobis(isobutyronitrile) containing one or more carbon-carbon double bonds. With some embodiments, the free radical initiator is present in an amount of from 0.01 percent by weight to 5 percent by weight, based on weight of reactants. The thiol-ene reaction can be conducted under any suitable temperature, such as from room temperature (e.g., about 25° C.) to 100° C. The reaction temperature typically depends at least in part on the temperature or temperature range under which the free radical initiator is thermally activated.

When the reactants are multifunctional, such as a polythiol having two or more thiol groups and a material having two or more carbon-carbon double bonds, the thiol-ene reaction can result in the formation of some oligomeric species. With some embodiments, the formation of oligomeric species can be minimized by adjusting the molar ratio of the reactants. For purposes of non-limiting illustration, with the reaction between a dithiol and a material having two carbon-carbon double bonds (that are reactive with thiol groups), the dithiol can be present in a molar excess relative to the material having two carbon-carbon double bonds, such as a molar ratio of greater than or equal to 2:1, or greater than or equal to 3:1, or greater than or equal to 4:1.

It should be understood that for purposes of the present invention, "base catalyzed thiol-ene reaction" conditions are the preferred conditions of thiol-ene reaction of a thiol compound with a material having (meth)acrylate group(s). Base catalysts that can be used for these purposes include base catalysts known to those skilled in the art; tertiary amines, including but not limited to triethylamine, 1,8-diazabicyclo[5.4.0]undec-7-ene, 1,5-diazabicyclo[4.3.0]non-5-ene, and 1,4-diazabicyclo[2.2.2]octane; and tertiary phosphines, including but not limited to trioctylphosphine, tributylphosphine, triphenylphosphine, methyldiphenylphosphine, and dimethylphenylphosphine.

The polymerizable component (a), according to some embodiments of the present invention can optionally include, in addition to the first (meth)acrylate functional monomer represented by Formula (I), at least one second (meth)acrylate functional monomer represented by the following Formula (III).

Formula (III)

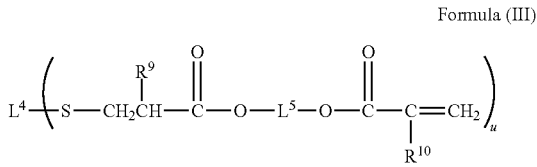

With reference to Formula (III) and as described previously herein, $L^4$ is a multivalent optionally substituted hydrocarbyl group optionally interrupted with at least one of —C(O)—, —S—, —O— and combinations thereof. With further reference to Formula (III), $L^5$ is independently for each u a divalent optionally substituted hydrocarbyl group. The $R^9$ and $R^{10}$ groups of Formula (III) are each independently selected for each u from hydrogen and methyl, and u is from 2 to 6.

The multivalent linking group $L^4$ of Formula (III) can be selected from those classes and examples of multivalent linking groups described previously herein with reference to $L^1$ of Formula (I). The divalent linking groups $L^5$ of Formula (III) can be selected from those classes and examples of divalent linking groups described previously herein with reference to $L^2$ of Formula (I).

The multivalent linking group $L^4$ of Formula (III) can, with some embodiments, be selected from multivalent linear or branched optionally substituted $C_1$-$C_{25}$ alkyl, multivalent optionally substituted $C_3$-$C_{12}$ cycloalkyl, multivalent optionally substituted aryl, and combinations thereof optionally interrupted with at least one of —C(O)—, —S—, —O— and combinations thereof. With some embodiments, u of Formula (II) is 2, and the multivalent linking group $L^4$ is a divalent linking group, which can be represented by Formula (B), as described previously herein with regard to Formula (I).

The divalent linking groups $L^5$ of Formula (III), with some embodiments, can each be independently selected for each u from: divalent linear or branched optionally substituted $C_1$-$C_{25}$ alkyl, or divalent linear or branched optionally substituted $C_1$-$C_{10}$ alkyl, or divalent linear or branched optionally substituted $C_1$-$C_4$ alkyl, or divalent optionally substituted $C_1$-$C_2$alkyl; divalent optionally substituted $C_3$-$C_{12}$ cycloalkyl, such as such as divalent optionally substituted $C_5$-$C_8$ cyclic alkyl; divalent optionally substituted aryl, such as divalent phenyl, including linear or branched $C_1$-$C_9$ alkyl substituted divalent phenyl; and combinations thereof. The divalent linking group $L^5$ of Formula (III) can, with some embodiments, be represented by Formula (C), as described previously herein with regard to Formula (I).

The second (meth)acrylate functional monomer represented by Formula (III) can be prepared by art-recognized methods. For purposes of non-limiting illustration, when u is 2, a polythiol, such as dimercaptodiethylsulfide, is reacted with a bis-(meth)acrylate, such as alkyleneglycol bis(meth) acrylate including, but not limited to, ethyleneglycol bis (meth)acrylate, or, polyalkyleneglycol bis(meth)acrylate including, but not limited to, diethyleneglycol bis(meth) acrylate, under base catalyzed thiol-ene reaction conditions, which results in formation of a second (meth)acrylate functional monomer represented by Formula (III). Synthesis of the second (meth)acrylate functional monomer represented by Formula (II) can result in the formation of coproducts, such as oligomeric coproducts, which can optionally be present in the polymerizable compositions of the present invention.

In accordance with some embodiments, and with reference to Formula (III), u is 2, and $L^4$ is represented by Formula (G-1) and more particularly by Formula (G-3), as described previously herein. When u is 2 and $L^4$ is represented by Formula (G-1) or more particularly by Formula (G-3), $L^5$ of Formula (III) is, with some embodiments represented by Formula (C), as described previously herein with regard to Formula (I). Such a Formula (III) type (meth)acrylate monomer can be prepared by art-recognized methods. For purposes of non-limiting illustration, 2 moles of a dithiol, such as dimercaptodiethylsulfide, are reacted with one mole of vinyl-cyclohexene, such as 4-vinyl-1-cyclohexene or 3-vinyl-1-cyclohexene, under free radical thiol-ene reaction conditions, which results in a thiol-functional intermediate. The thiol-functional intermediate is then reacted with a bis(meth)acrylate, such as alkyleneglycol bis(meth)acrylate or polyalkyleneglycol bis(meth)acrylate, under base catalyzed thiol-ene reaction conditions, which results in formation of a second (meth)acrylate functional monomer represented by Formula (III), in which $L^4$ is represented by Formula (G-1) or more particularly by Formula (G-3), and $L^5$ is represented by Formula (C).

The polymerizable component (a) includes, in some embodiments, a (meth)acrylate monomer represented by Formula (I) and at least one of a thio(meth)acrylate monomer represented by Formula (II) and/or a (meth)acrylate monomer represented by Formula (III). When composed of a (meth)acrylate monomer represented by Formula (I) and at least one further monomer represented by Formulas (II) and/or (III), the (meth)acrylate monomer represented by Formula (I) is present, with some embodiments, in an amount of from 1 to 99 percent by weight, or from 20 to 90 percent by weight, or from 40 to 80 percent by weight, and the further monomer represented by Formula (II) and/or Formula (III) is present in a combined amount of from 1 to 99 percent by weight, or from 10 to 75 percent by weight, or from 20 to 60 percent by weight, the percent weights in each case being based on total weight of the recited monomers.

In accordance with some embodiments, and as described previously herein, the polymerizable component (a) includes at least one thio(meth)acrylate functional monomer represented by Formula (II) and at least one meth(acrylate) functional monomer represented by Formula (III). The monomers represented by Formulas (II) and (III) are each independently as described previously herein. In some embodiments, the polymerizable component comprising monomers represented by Formulas (II) and (III) is free of (meth)acrylate functional monomers represented by Formula (I). The relative amounts of monomers represented by Formulas (II) and Formula (III) can vary widely. In accordance with some embodiments, the thio(meth)acrylate functional monomer(s) represented by Formula (II) are present in an amount of from 20 to 99 percent by weight, or from 35 to 90 percent by weight, or from 50 to 80 percent by weight, and the (meth)acrylate functional monomer(s) represented by Formula (III) is present in an amount of from 1 to 80 percent by weight, or from 10 to 65 percent by weight, or from 20 to 50 percent by weight, the percent weights in each case being based on the total weight of the recited monomers.

The polymerizable component (a) can include, with some embodiments, at least one diethylenically unsaturated monomer chosen from, 1,2-divinylbenzene, 1,3-divinylbenzene, 1,4-divinylbenzene, bisphenol A ethoxylate diacrylate (CAS #64401-02-1), bisphenol A ethoxylate dimethacrylate (CAS #41637-38-1), bisphenol A propoxylate diacrylate (CAS

67952-50-5), bisphenol A propoxylate dimethacrylate, Bisphenol A glycerolate diacrylate (CAS #4687-94-9), bisphenol A glycerolate dimethacrylate (CAS #1565-94-2), bisphenol F ethoxylate diacrylate (CAS #120750-67-6), bisphenol F ethoxylate dimethacrylate, bisphenol F propoxylate diacrylate, bisphenol F propoxylate dimethacrylate, bisphenol S ethoxylate diacrylate, bisphenol S ethoxylate dimethacrylate, bisphenol S propoxylate diacrylate, bisphenol S propoxylate dimethacrylate, polyethylene glycol di(meth)acrylate, polypropylene glycol di(meth)acrylate, (meth)acrylic anhydride, or mixtures thereof. The concentrations of the aforementioned co-monomers, individually or in combination, range from 0.5% to 60%, based upon the total monomer weight of the polymerizable component (a). The effect of the material on refractive index and other properties of the finished polymer is taken into consideration regarding the amount used individually or in combination.

Further, the polymerizable component (a) also can include at least one polyethylenically unsaturated monomer chosen from trimethylolpropane tri(meth)acrylate, trimethylolethane tri(meth)acrylate, ditrimethylolpropane tetra(meth)acrylate, pentaerythritol tri(meth)acrylate, pentaerythritol tetra(meth)acrylate, dipentaerythritol penta(meth)acrylate, di(pentaerythritol hexa(meth)acrylate, tris(2-hydroxyethyl) tri(meth)acrylate, 2,4,6-triallyloxy-1,3,5-triazine (CAS #101-37-1), 1,3,5-triallyl-1,3,5-triazine-2,4,6(1H,3H,5H)-trione (CAS #1025-15-6), or mixtures thereof. The concentrations of the aforementioned co-monomers, individually or in combination, range from 0.1% to 20%, based upon the total monomer weight of the polymerizable component (a). The effect of the material on refractive index and other properties of the finished polymer is taken into consideration regarding the amount used individually or in combination.

With some embodiments, the polymerizable component (a) includes at least one (meth)acrylate functional monomer represented by Formula (IV), as described previously herein. The multivalent $L^6$ and divalent $L^7$ groups of Formula (IV) can be selected from those groups as described previously herein with regard to $L^1$ and $L^2$ of Formula (I), respectively. With some embodiments of the present invention, the multivalent $L^6$ group of Formula (IV) is selected from multivalent linear or branched optionally substituted $C_1$-$C_{25}$ alkyl, multivalent optionally substituted $C_3$-$C_{12}$ cycloalkyl, multivalent optionally substituted aryl, and combinations thereof optionally interrupted with at least one of —C(O)—, —S—, —O— and combinations thereof. In accordance with additional embodiments, the divalent $L^7$ group of Formula (IV) is independently for each v selected from divalent linear or branched optionally substituted $C_1$-$C_{25}$ alkyl, divalent optionally substituted $C_3$-$C_{12}$ cycloalkyl, divalent optionally substituted aryl, and combinations thereof optionally interrupted with at least one of —O— and —S—.

With further reference to Formula (IV), with some embodiments of the present invention, the divalent $R^{12}$ group can be selected, independently for each w, from those groups as described previously herein with regard to $R^4$ of Formula (C). With some embodiments, each $R^{12}$, of Formula (IV), for each w is independently selected from divalent linear or branched optionally substituted $C_1$-$C_{10}$ alkyl, and divalent optionally substituted $C_3$-$C_{12}$ cycloalkyl.

With further reference to Formula (IV) and in accordance with some embodiments, v is 2, and $L^6$ is a trivalent residue of a hydroxyl functional compound having a single carbon-carbon triple bond. Examples of hydroxyl functional compounds having a single carbon-carbon triple bond from which the (meth)acrylate functional monomer represented by Formula (IV) can be prepared include, but are not limited to, propargyl alcohol, 2-butyne-1,4-diol, 3-butyne-2-ol, 3-hexyne-2,5-diol, and mixtures of two or more thereof. A portion of the hydroxyl functional groups on the hydroxyl functional compound having a single carbon-carbon triple bond may be esterified. For example, a portion of the hydroxyl functional compound having a single carbon-carbon triple bond may include an alkyne-functional ester of a $C_1$-$C_{12}$ carboxylic acid such as propargyl acetate, propargyl propionate, propargyl benzoate, and the like.

When v is 2 and $L^6$ is a trivalent residue of a hydroxyl functional compound having a single carbon-carbon triple bond, the (meth)acrylate monomer represented by Formula (IV) can be prepared in accordance with the following general description with propargyl alcohol as the hydroxyl functional compound having a single carbon-carbon triple bond. Typically, a thiol functional intermediate is first formed by reacting 1 mole of propargyl alcohol with about two moles of a dithiol, such as dimercaptodiethylsulfide, under art-recognized free radical thiol-ene reaction conditions. The dithiol groups can each form a covalent bond with one carbon of the C—C triple bond group, or with both carbons of the C—C triple bond group. While not intending to be bound by any theory, it is believed that one dithiol group forms a covalent bond with each separate carbon of the C—C triple bond. The resulting thiol functional intermediate is reacted with at least 2 moles, such as 2 to 3 moles of an oxirane functional material, such as ethylene oxide, or a cyclic ether, which results in the formation of a hydroxyl functional intermediate. Alternatively, said thiol functional intermediate can be reacted with at least 2 moles, such as 2 to 3 moles, of a 2-halo-1-hydroxyl-alkane, such as 2-chlorethanol, in accordance with art-recognized method, thus forming a hydroxyl functional intermediate. Likewise, the thiol functional intermediate can be reacted with at least 2 moles, such as 2 to 3 moles, of a 1,2-alkylene carbonate, such as ethylene carbonate, in accordance with art-recognized methods, this forming a hydroxyl functional intermediate. The hydroxyl functional intermediate is then reacted with at least 2 moles, such as 2 to 6 moles of a (meth)acrylate with concurrent removal of alcohol, so as to result in formation of the (meth)acrylate functional monomer represented by Formula (IV). Alternatively, the hydroxyl functional intermediate can be reacted with at least 2 moles, such as 2 to 3 moles of a (meth)acryloyl halide, such as (meth)acryloyl chloride, which results in formation of the (meth)acrylate functional monomer represented by Formula (IV), after art-recognized work-up procedures to separate the desired product from the resulting hydrogen halide. Formation of the thiol functional intermediate can result in the concurrent formation or oligomeric species, which can optionally be present in combination with the (meth)acrylate functional monomer represented by Formula (IV).

During formation of some (meth)acrylate functional monomers represented by Formula (IV), formation of the thiol functional intermediate as described previously herein, can be carried out in the presence of a free-radical initiator. The free-radical initiator can be selected from art-recognized compounds. Non-limiting examples of free-radical initiators include, but are not limited to, azo or peroxide type free-radical initiators, such as azobisalkalenenitriles. The free-radical initiator can be selected from azobisalkalenenitriles, which are commercially available from DuPont under the tradename VAZO. Examples of VAZO initiators that can be used, include, but are not limited to, VAZO-52, VAZO-64, VAZO-67, VAZO-88 initiators, and mixtures thereof. Preparation of the thiol functional intermediate is described in further detail in U.S. Pat. No. 7,888,436 B2 at column 8, lines 3-53, which disclosure is incorporated herein by reference.

With some embodiments of the present invention, polymerizable components that include at least one (meth)acrylate functional monomer represented by Formula (IV), can further include at least one monomer selected from monomers represented by Formula (I), Formula (II), Formula (III), and combinations of two or more thereof. When the polymerizable component (a) is, with some embodiments, composed of a (meth)acrylate monomer represented by Formula (IV) and at least one further monomer represented by Formulas (I), (II) and/or (III), the (meth)acrylate monomer represented by Formula (IV) is present in an amount of from 1 to 99 percent by weight, or from 25 to 95 percent by weight, or from 50 to 90 percent by weight, and the further monomer represented by Formulas (I), (II) and/or (III) is present in a combined amount of from 1 to 99 percent by weight, or from 5 to 75 percent by weight, or from 10 to 50 percent by weight, the percent weights in each case being based on the total weight of the recited monomers.

In accordance with some non-limiting embodiments, the polymerizable component includes a (meth)acrylate monomer represented by Formula (IV) and a (meth)acrylate monomer represented by Formula (I), in which $L^1$ of the (meth)acrylate monomer represented by Formula (I) is free of substitution with a group represented by the following Formula (M):

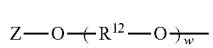

Formula (M)

With reference to Formula (M), Z, $R^{12}$ and w are each as described previously herein with regard to Formula (IV).

In a particular embodiment, the polymerizable component comprises:

(a) at least one thio(meth)acrylate functional monomer represented by the following Formula (IIg),

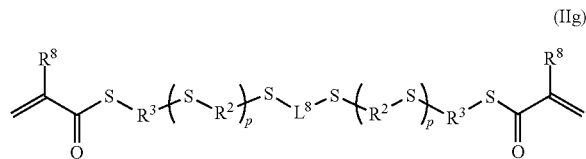

(IIg)

wherein,
$L^8$ is a divalent linking group selected from,
  (i) a divalent linking group represented by the following Formula (D), $$-C(R^6)(R^7)-$$ (D)

wherein $R^6$ and $R^7$ each independently are selected from hydrogen, linear or branched optionally substituted $C_1$-$C_{10}$ alkyl, optionally substituted $C_3$-$C_{12}$ cycloalkyl, and optionally substituted aryl, or $R^6$ and $R^7$ together form a $C_4$-$C_{12}$ optionally substituted cycloalkyl, and
  (ii) a divalent linking group represented by the following Formula (A),

(A)

wherein Y is O or S, and
$R^2$ for each p is independently selected from divalent linear or branched optionally substituted $C_1$-$C_{10}$ alkyl, and/or divalent optionally substituted $C_3$-$C_{12}$ cycloalkyl, each $R^3$ independently is selected from divalent linear or branched optionally substituted $C_1$-$C_{10}$ alkyl, and/or divalent optionally substituted $C_3$-$C_{12}$ cycloalkyl, each p is from 0 to 10, each $R^4$ is independently selected from hydrogen and methyl; and (b) optionally a polymerization moderator.

The monomers used in the polymerizable component such as the monomers represented by Formula (I), (II), (III) and (IV), can be prepared, as described previously herein, from polythiols having two or more thiol groups. Examples of polythiols that can be used to prepare the monomers such as, but not limited to, monomers represented by Formula (I), Formula (II), Formula (III), Formula (IV) and related monomers, include, but are not limited to, 1,2-ethanedithiol, 2,2'-thiodiethanethiol, 2,5-dimercaptomethyl-1,4-dithiane, 1,2-bis-(2-mercaptoethylthio)-3-mercaptopropane, pentaerythritol tetrakis(3-mercaptopropionate), pentaerythritol tetrakis(2-mercaptoacetate), tetrakis(7-mercapto-2,5-dithiaheptyl)methane, trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate), poly(ethylene glycol) di(3-mercaptopropionate), a polythiol monomer represented by the following Formula (K),

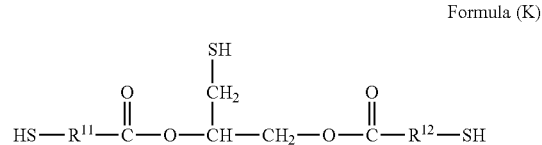

Formula (K)

With reference to Formula (K), $R^{11}$ and $R^{12}$ are each independently as described previously herein with reference to Formula $L^1$(a). A polythiol represented by Formula (K) can be prepared by an art-recognized esterification or transesterification reaction between, for example, 3-mercapto-1,2-propanediol (Chemical Abstract Service (CAS) Registry No. 96-27-5) and a thiol functional carboxylic acid or thiol functional carboxylic acid ester in the presence of a strong acid catalyst, such as methane sulfonic acid, with the concurrent removal of water or alcohol from the reaction mixture. The polythiol represented by Formula (K) optionally further includes coproducts, such as oligomers which can optionally include disulfide (—S—S—) linkages, resulting from its synthesis.

A non-limiting example of another dithiol that can be used to prepare the monomers is represented by the following Formula (N-1).

Formula (N-1)

With reference to Formula (N-1) $R^2$, $R^3$ and p are each independently as described previously herein with regard to Formula (B). With further reference to Formula (N-1), $L^8$ is as described previously herein with regard to Formulas (G-1), (G-2) and (G-3).

With some embodiments, and as described previously herein with regard to Formula (G-1), (G-2) and (G-3), L⁸ is a residue of a optionally substituted hydrocarbyl having two non-conjugated carbon-carbon double bonds, such as vinylcyclohexene. The monomers of the polymerizable component (a) can, with some embodiments, be prepared using a dithiol represented by the following Formula (N-2).

Formula (N-2)

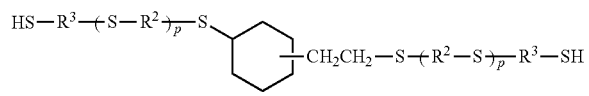

With reference to Formula (N-1), R², R³ and p are each independently as described previously herein with reference to Formula (B). With some embodiments, the two groups bonded to the cyclohexane ring of Formula (N-2) are ortho, meta or para relative to each other, and are not bonded to the same carbon of the cyclohexane ring.

In some particular embodiments of the present invention, L² of Formula (I); L⁷ of Formula (IV); R³ of Formula (Id); R⁴/R⁵ of Formula (1a); and L² of Formula (Ic) are each a divalent hydrocarbyl group containing one carbon atom, such as —CH₂—, —CH(R)—, or —C(R¹)(R²)— where each of R, R¹ and R² independently represents an optionally substituted hydrocarbyl group. For example, such a monomer, where L² of Formula (I) is —CH₂—, can be synthesized by reacting 1 molar equivalent of mercaptan with 1 molar equivalent of formaldehyde (such as paraformaldehyde) resulting in an intermediate containing terminal hemithioacetal groups. This OH-terminated molecule then can be (meth)acrylated, either by reaction with (meth)acryloyl chloride or (meth)acrylic anhydride; direct esterification with (meth)acrylic acid; or by transesterification with an alkyl (meth)acrylate (such as methyl (meth)acrylate). Alternatively, the mercaptan can be reacted with a substituted aldehyde (HC(=O)R) instead of formaldehyde. For example, when mercaptan is reacted with benzaldehyde, L² would represent —CH(R)—, where R is phenyl.

In a further embodiment of the present invention, each of L² of Formula (I); L⁷ of Formula (IV) and R³ of Formula (Id) can be a divalent optionally substituted hydrocarbyl group, where the optional substitution is an aryl group, such as a phenyl group. For example, L² of Formula (I) can be —CH₂CH(R)— or —CH(R)—CH₂—, where R represents a phenyl group. This reaction product can result from the reaction of 1 molar equivalent of mercaptan with 1 molar equivalent of styrene oxide (through ring opening of the epoxide ring), to form a poly-hydroxy terminated sulfur-containing material with aromatic rings, followed by formation of (meth)acrylate end groups through the reaction of the terminal OH groups with either (meth)acryloyl chloride or (meth)acrylic anhydride, direct esterification with (meth) acrylic acid, or by transesterification with an alkyl (meth) acrylate.

The polymerizable component (a) can further include, with some embodiments, a polymerization moderator. The presence of polymerization moderator can minimize the formation of any distortions or defects, e.g., striations and or cracks/fissures, in polymerizates that may be obtained from the polymerizable compositions of the present invention. Examples of polymerization moderators that can be included in the polymerizable compositions of the present invention include but are not limited to, dilauryl thiodipropionate, 1-isopropyl-4-methyl-1,4-cyclohexadiene (γ-terpinene); 1-isopropyl-4-methyl-1,3-cyclohexadiene (α-terpinene); 1-methyl-4-(propan-2-ylidene)cyclohex-1-one (terpinolene); and alpha-methyl styrene dimer, 1,1-diphenylethylene, cis-1,2-diphenylethylene, 3,7,7-trimethylbicyclo [4.1.0]hept-3-ene (3-carene), 4-isopropenyl-1-methylcyclohexene (dipentene), (S)-(−)-4-isopropenyl-1-methylcyclohexene ((S)-limonene), 2,6-dimethyl-2,4,6-octatriene, 4-tert-butylpyrocatechol, triphenylmethane, and mixtures of two or more thereof.

With some embodiments, the polymerization moderator is selected from 1-isopropyl-4-methyl-1,4-cyclohexadiene; 1-isopropyl-4-methyl-1,3-cyclohexadiene; 1-methyl-4-(propan-2-ylidene)cyclohex-1-ene; 2,6-dimethyl-2,4,6-octatriene, and alpha-methyl styrene dimer.

As used herein, the term "alpha-methyl styrene dimer" means a polymerization moderator that includes 2,4-diphenyl-4-methyl-1-pentene, and optionally at least one of 2,4-diphenyl-4-methyl-2-pentene and/or 2-phenyl-1-propene (which is also referred to as, alpha-methyl styrene). With some embodiments, the alpha-methyl styrene dimer polymerization moderator includes 90 to 93 percent by weight of 2,4-diphenyl-4-methyl-1-pentene, 6 to 8 percent by weight of 2,4-diphenyl-4-methyl-2-pentene, and 0.25 to 0.75 percent by weight of 2-phenyl-1-propene, the percent weights in each case being based on total weight of alpha-methyl styrene dimmer.

The polymerization moderator can be present in the polymerizable non-aqueous dispersions of the present invention in a wide range of amounts. In some embodiments, the polymerization moderator is present in the polymerizable non-aqueous dispersions of the present invention, in an amount from 0.01 percent to 15 percent by weight, or from 0.1 percent to 8 percent by weight, or from 0.3 percent to 5 percent by weight, based on the total weight of monomers and polymerization moderator.

The polymerizable component (a) can further include, with some embodiments, an initiator that is capable of initiating free radical polymerization of and amongst the ethylenically unsaturated groups of the monomers thereof. The initiator may be a free radical initiator that is thermally activated. By "thermally activated" means the free radical initiator becomes active at elevated temperature, such as at temperatures greater than ambient room temperature, such as greater than 25 C, as will be described in further detail herein.

The thermally activated free radical initiator can, with some embodiments, be selected from organic peroxy compounds, azobis(organonitrile) compounds, N-acyloxyamine compounds, O-imino-isourea compounds, and combinations of two or more thereof.

With some embodiments, the thermally activated free radical initiator is selected from one or more organic peroxy compounds. Examples of organic peroxy compounds, that may be used as thermal polymerization initiators include, but are not limited to: peroxymonocarbonate esters, such as tertiarybutylperoxy 2-ethylhexyl carbonate and tertiarybutylperoxy isopropyl carbonate; peroxyketals, such as 1,1-di-(t-butyl peroxy)-3,3,5-trimethylcyclohexane; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauryl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide.

With some embodiments, further examples of peroxy compounds from which the free radical initiator can be selected include, but are not limited to, 2,5-dimethyl-2,5-di (2-ethylhexanoylperoxy)hexane, and/or 1,1-bis(tert-butylperoxy)-3,3,5-trimethylcyclohexane.

Examples of azobis(organonitrile) compounds, that may be used as thermal polymerization initiators in the polymerizable non-aqueous dispersions of the present invention, include, but are not limited to, azobis(isobutyronitrile), 2,2'-azobis(2-methyl-butanenitrile), and/or azobis(2,4-dimethylvaleronitrile).

With some further embodiments of the present invention, the thermally activated free radical initiator is selected from 1-acetoxy-2,2,6,6-tetramethylpiperidine, and/or 1,3-dicyclohexyl-O—(N-cyclohexylideneamino)-isourea.

The amount of thermal polymerization initiator used to initiate and polymerize the polymerizable non-aqueous dispersions of the present invention can vary, and can depend at least in part on the particular initiator or initiators used. With some embodiments, only that amount that is required to initiate and sustain the polymerization reaction is required, which can be referred to as an initiating amount. With some embodiments, the thermally activated free radical initiator is present in an amount of from 0.01 to 7 parts of initiator, or from 0.1 to 3.5 parts initiator, or from 0.5 to 2.5 parts initiator, in each case the parts initiator being per 100 parts of monomer(s) (phm) present in the polymerizable non-aqueous dispersion.

The polymerizable non-aqueous dispersions of the present invention further comprise (b) polymeric microparticles dispersed in the continuous phase. The polymeric microparticles in turn comprise a dispersion polymerization reaction product prepared from a reaction mixture comprising (i) an ethylenically unsaturated monomer; and (ii) an acrylic polymer stabilizerr.

The ethylenically unsaturated monomer (i) may be a single type of monomer or a mixture of monomers. These monomers are sometimes referred to herein as the "core monomers", as distinguished from the monomers used in the acrylic stabilizer or seed polymer. Suitable core monomers include but are not limited to methyl (meth)acrylate, ethyl (meth)acrylate, n-butyl (meth)acrylate, isobutyl (meth)acrylate, 2-ethylhexyl (meth)acrylate, isobornyl (meth)acrylate, 2-hydroxyethyl (meth)acrylate, 2-hydroxypropyl (meth)acrylate, (meth)acrylic acid, glycidyl (meth)acrylate, styrene, diethylene glycol bis(allylcarbonate), alpha-methylstyrene, lauryl (meth)acrylate, stearyl (meth)acrylate, itaconic acid and its esters, and the like. In a particular embodiment the ethylenically unsaturated monomer may comprise the polymerizable component (a) as described hereinbefore. In certain embodiments the core monomers comprise two or more coreactive monomers, such as glycidyl methacrylate and acrylic acid. It will be understood by those skilled in the art that the use of coreactive monomers will result in branching, or internal crosslinking, of the core during the polymerization process in the making of the polymeric microparticles. Alternatively, the internal crosslinking can be introduced by using a polyfunctional ethylenically unsaturated monomer, such as hexanediol diacrylate, ethylene glycol dimethacrylate, trimethylol propane triacrylate, diethylene glycol bis(allylcarbonate), divinylbenzene, or other suitable poly(meth)acrylate, in the core monomer composition.

The terms "acrylic polymer stabilizer" or simply "acrylic stabilizer" as used in the context of the present invention refer to a polymer that comprises 50 weight % or greater (meth)acrylic monomers. In certain embodiments, the acrylic stabilizers (ii) comprise 75 weight % or greater, such as 90 weight % or greater or 95 weight % or greater of acrylic monomers. In certain embodiments the stabilizer comprises 100 weight % acrylic monomers. In certain embodiments, the stabilizer comprises polar acrylic monomers, such as hydroxyl functional acrylic monomers, in an amount of 30 weight % or less, such as 20 weight % or less, 15 weight % or less or 10 weight % or less. The term "polar" as used herein refers to acrylic monomers or compounds that have a solubility parameter (van Krevelen) at 298 K of 19 MPa or more. In other embodiments, the stabilizer comprises nonpolar acrylic monomers, such as 2-ethyl hexyl acrylate, which can be in amounts of 5 weight % or greater, such as 10 weight % or greater. The term "non-polar" describes substances that have a solubility parameter (van Krevelen) at 298 K lower than 19 MPa. Weight %, as used in the context of weight % of monomers, refers to the weight % of monomers used in the formation of the stabilizer, and does not include other ingredients, such as initiators, chain transfer agents, additives and the like, used to form the stabilizer. As used herein, the term (meth)acrylic refers generally to acrylics, methacrylics, styrene and any derivatives of any of these.

Suitable monomers for the preparation of the acrylic stabilizer include but are not limited to methyl (meth)acrylate, ethyl (meth)acrylate, n-butyl (meth)acrylate, isobutyl (meth)acrylate, 2-ethylhexyl (meth)acrylate, isobornyl (meth)acrylate, 2-hydroxyethyl (meth)acrylate, 2-hydroxypropyl (meth)acrylate, (meth)acrylic acid, glycidyl (meth)acrylate, styrene, alpha-methylstyrene, lauryl (meth)acrylate, stearyl (meth)acrylate, itaconic acid and its esters, allyl (meth)acrylate, ethylene glycol dimethacrylate, hexanediol diacrylate and the like. As noted above, 50 weight % or greater of the monomers used in the formation of the acrylic stabilizer are acrylic.

In certain embodiments, the acrylic stabilizer is nonlinear. As used herein, the term "nonlinear" means that there is at least one branch point along the backbone of the polymer. In some cases, there may be multiple branch points (i.e. "hyperbranched"), and in some embodiments, the branches can form connections between polymer chains (i.e. internal crosslinks). It will be appreciated that polymer branching can be quantified using the Mark-Houwink parameter. In certain embodiments, the Mark-Houwink parameter of the present nonlinear acrylic stabilizers as measured by triple detection GPC is 0.2-0.7, such as 0.3-0.6. The branching can be introduced, for example, by using a polyfunctional ethylenically unsaturated monomer in the formation of the acrylic stabilizer. A polyfunctional ethylenically unsaturated monomer is a monomer that has two or more ethylenically unsaturated functional groups within the same monomer molecule, such as allyl (meth)acrylate, ethylene glycol dimethacrylate, or hexanediol diacrylate. Alternatively, the branching can be introduced by using two or more coreactive monomers, such as glycidyl methacrylate and acrylic acid, in the formation of the acrylic stabilizer.

In certain embodiments, the acrylic stabilizer contains ethylenic unsaturation. This ethylenic unsaturation can be introduced, for example, by using a polyfunctional ethylenically unsaturated monomer in the formation of the acrylic stabilizer, wherein the two (or more) ethylenically unsaturated functional groups within the monomer molecule have different reactivities towards the other (meth)acrylate monomers used to form the stabilizer. Each polyfunctional ethylenically unsaturated monomer molecule may react completely with other (meth)acrylate monomers to form branch points/crosslinks, or it may react incompletely and retain at least one of its ethylenically unsaturated functional groups. This unsaturation is then available to react during the preparation of the non-aqueous dispersion, allowing the acrylic stabilizer to be covalently bonded to the dispersed phase polymer. A suitable monomer for this purpose can be, for example, allyl (meth)acrylate. Alternatively, the unsaturation can be introduced by reacting the acrylic polymer with a compound that comprises both ethylenic unsaturation and another functional group that can react with a functional group on the acrylic polymer. For example, the acrylic polymer can have oxirane groups, and the compound can comprise a (meth)acrylate group and an acid group, so that the acid group on the compound would react with the oxirane group on the acrylic polymer. The reaction conditions can be controlled so that polymerization of the (meth)acrylate groups on the compound would be prevented; suitable controls would be a reduced reaction temperature such as below 110° C., the presence of a free radical inhibitor such as para-methoxyphenol, and the use of an oxygen-rich atmosphere. Under controlled conditions such as these, the (meth)acrylate group on the compound would be retained, and this unsaturation would then be available to react during the preparation of the non-aqueous dispersion, allowing the acrylic stabilizer to be covalently bonded to the dispersed phase polymer. A suitable example for the introduction of unsaturation to the acrylic stabilizer would be the reaction of an acrylic polymer that comprises glycidyl methacrylate, such as 3-15 weight % glycidyl methacrylate, with methacrylic acid, where the ratio of acrylic polymer to methacrylic acid is from about 200:1 to about 33:1.

Generally, the acrylic stabilizer is formed by solution polymerization of the (meth)acrylate monomers by a standard radical polymerization method known to those skilled in the art. For example, the (meth)acrylate monomers can be added over a period of time to a suitable solvent at an elevated temperature, such as at the reflux temperature of the solvent. A radical initiator, such as a peroxide initiator, is added to the reaction mixture over approximately the same time period. The initiator is chosen so that it will induce radical polymerization of the monomers at the selected reaction temperature. Suitable free radical initiators include peroxy initiators such as benzoyl peroxide, lauroyl peroxide, or tert-butylperoxy-2-ethyl-hexanoate (tert-butylperoctoate) and azo initiators such as 2,2'-azobis (2,4-dimethylpentane nitrile) or 2,2'-azobis (2-methylbutane nitrile). After the monomers and initiator have been added to the reaction mixture, the mixture may be held at the reaction temperature for an extended period of time, during which additional initiator may be added to ensure complete conversion of the monomers. Progress of the reaction may be monitored by solids measurement, or by gas chromatography.

In certain embodiments, the acrylic stabilizer can be prepared in a continuous reactor. For example, (meth)acrylate monomers and a radical initiator, such as a peroxide initiator, can be fed continuously through a continuous reactor with a 1 to 20 minute residence time at 150-260° C. The (meth)acrylate monomers used herein could be polar, non-polar, or a mixture of both types.

In certain embodiments, the molar ratio of acrylate to methacrylate in the acrylic stabilizer can be about 2:1. In other embodiments, the initiator level is 0.5 to 2.0 weight %, such as 1.0 to 1.5 weight % based on the total weight of the monomers.

The acrylic stabilizer can have a weight average molecular weight ("Mw") as measured by gel permeation chromatography relative to linear polystyrene standards of 10,000 to 1,000,000, such as 20,000 to 80,000, or 30,000 to 60.000. The stabilizer may comprise ethylenic unsaturation, as detected by 13C NMR spectroscopy. The stabilizer can contain functional groups, such as hydroxyl groups, carboxylic acid groups, and/or epoxy groups.

In one embodiment, the reaction mixture used to prepare the polymeric microparticles further comprises (iii) an aliphatic polyester stabilizer. As used herein, the term "aliphatic polyester" refers to a polyester that is soluble in an aliphatic hydrocarbon solvent such as heptane. The carbon to oxygen ratio of the polyester can be used to predict this solubility. The ratio can be calculated from the mole ratio of the monomers minus the water of esterification. For example, if the carbon to oxygen ratio of the polyester is from 4:1 to 20:1, such as from 6:1 to 12:1, the polyester would be soluble in a hydrocarbon solvent such as heptane, or in a slightly more polar solvent system, such as 60% ISOPAR K and 40% butyl acetate. ISOPAR K is a hydrocarbon solvent commercially available from the ExxonMobile Company. A suitable polyester would be, for example, poly-12-hydroxy stearic acid, which has a carbon to oxygen ratio of 9:1.

The aliphatic polyester can be used to prepare an aliphatic polyester stabilizer (also referred to herein as "polyester stabilizer"). The polyester stabilizer may comprise two segments, one of which comprises the aliphatic polyester described above, and one of which is of a different polarity from the polyester and is relatively insoluble in the aliphatic hydrocarbon solvent. The first of these is sometimes referred to herein as the "aliphatic polyester component" and the second as the "stabilizer component". Suitable stabilizer components are known and some examples have been described in U.S. Pat. No. 4,147,688, Column 5, Line 1-Column 6, Line 44, incorporated by reference herein.

In one embodiment, the aliphatic polyester (iii) can comprise poly-12-hydroxy stearic acid having a number average molecular weight of about 300 to 3,000 and comprising both acid and hydroxyl functionality. The poly-12-hydroxystearic acid may then be reacted with a compound that comprises (meth)acrylate functionality as well as a second type of functional group that can react with the hydroxyl functionality of the poly-12-hydroxy stearic acid. A suitable compound would be, for example, glycidyl (meth)acrylate. The reaction product of the poly-12-hydroxy stearic acid and glycidyl (meth)acrylate can be further reacted with an ethylenically unsaturated monomer having a different polarity from poly-12-hydroxy stearic acid by a standard free-radical polymerization reaction to provide the polyester stabilizer of the present invention. Suitable ethylenically unsaturated monomers include but are not limited to (meth)acrylic acid, methyl (meth)acrylate, ethyl (meth)acrylate, n-butyl (meth)acrylate, isobutyl (meth)acrylate, 2-ethylhexyl (meth)acrylate, isobornyl (meth)acrylate, 2-hydroxyethyl (meth)acrylate, 2-hydroxypropyl (meth)acrylate, (meth)acrylic acid, glycidyl (meth)acrylate, styrene, alpha-methylstyrene, lauryl (meth)acrylate, stearyl (meth)acrylate, itaconic acid and its esters, and the like. In one embodiment, the ethylenically unsaturated monomer comprises methyl methacrylate, glycidyl methacrylate, and methacrylic acid. It will be appreciated that standard free-radical polymerization techniques are well-known to those skilled in the art. The polyester stabilizer may be from 20 weight % to 65 weight % polyester, such as from 25 weight % to 60 weight %, 30 weight % to 55 weight %, or 33 weight % to 53 weight % polyester, with weight % based on the total weight of the components of the polyester stabilizer.

The polyester stabilizer can be used to prepare a seed polymer. As used herein, the term "seed polymer" refers to a dispersed polymer that has a particle size smaller than 80 nm, such as smaller than 50 nm. The seed polymer generally comprises the polyester stabilizer described above and dispersed polymer. The seed polymer can be prepared by dissolving the polyester stabilizer in a suitable solvent or mixture of solvents, and the monomer(s) used to form the seed polymer ("seed monomer(s)") may be added to the solution at an elevated temperature over a period of time, during which a radical initiator may also be added to the mixture. The dispersed polymer can be covalently bonded, or grafted, to the polyester stabilizer. A seed polymer can be prepared, for example, from a polyester stabilizer and an ethylenically unsaturated monomer such as a (meth)acrylate monomer. The polymer formed from the ethylenically unsaturated monomer should be insoluble in the continuous phase in order to provide a stable dispersion. It will be appreciated by those skilled in the art that, if the polyester stabilizer comprises ethylenic unsaturation, then in addition to the polymerization of the seed monomer(s) with other seed monomer(s), at least some of the polymerizable double bonds of the stabilizer will react with some of the seed monomer(s) under these conditions. Through this process, the seed polymer will become grafted, that is, covalently bonded, to the polyester stabilizer. A suitable seed polymer can be prepared from a polyester stabilizer comprising poly-12-hydroxystearic acid in 60% ISOPAR K and 40% butyl acetate and methyl methacrylate.

The seed polymer as described above can be a stable dispersion. For example, the seed polymer can be prepared and stored for use at a later time. Alternatively, it can be used immediately in the preparation of the non-aqueous dispersion of the present invention.

The non-aqueous dispersions of the present invention may comprise functionality, such as hydroxyl functionality. The hydroxyl functionality can come from the core monomers and/or the acrylic stabilizer. In certain embodiments, the theoretical hydroxyl value can be from 20 to 100, such as from 40 to 80, or from 50 to 70. Alternatively, the non-aqueous dispersions of the present invention may comprise epoxy functionality. In some embodiments the epoxy equivalent weight may be 400 to 30,000, such as from 700 to 15,000. In certain embodiments the non-aqueous dispersions of the present invention may comprise both hydroxyl and epoxy functionality. In certain embodiments, the non-aqueous dispersions of the present invention may comprise acid functionality. In these embodiments, the theoretical acid value may be from 0.1 to 20, such as from 5 to 15.

The non-aqueous dispersions of the present invention may be internally crosslinked or uncrosslinked. Crosslinked non-aqueous dispersions may be desired in certain embodiments over uncrosslinked non-aqueous dispersions because uncrosslinked materials are more likely to swell or dissolve in the organic solvents that are commonly found in many of the coating compositions to which the dispersions are subsequently added. Crosslinked non-aqueous dispersions may have a significantly higher molecular weight as compared to uncrosslinked dispersions. Crosslinking of the non-aqueous dispersion can be achieved, for example, by including two or more coreactive monomers, or a polyfunctional ethylenically unsaturated monomer with the "core" monomers during polymerization, as described above for suitable "core" monomers. The two or more coreactive monomers, or polyfunctional ethylenically unsaturated monomer, can be present in amounts of 0.1 to 20% by weight based on the total weight of monomers used in preparing the non-aqueous dispersion, such as from 1 to 10% by weight.

In certain embodiments, the non-aqueous dispersions of the present invention will have a small particle size, such as less than 500 nm or less than 300 nm, as measured on ZETASIZER instrument. In some embodiments the particle size is less than 180 nm.

In some embodiments the non-aqueous dispersion of the present invention may be substantially free, may be essentially free and/or may be completely free of VOC (Volatile Organic Compounds), particularly non-polymerizable VOC. The term "substantially free" as used in this context means the continuous phase and/or dispersions contain less than 10%, "essentially free" means less than 5%, and "completely free" means less than 1% of VOC by weight of the continuous phase. The term "VOC" as used herein means any organic compound that volatilizes before, during or after polymerization of the polymerizable non-aqueous dispersion. For example, the continuous phase of the preliminary non-aqueous dispersion can comprise one or more VOCs.

The non-aqueous dispersions of present invention can be prepared as follows. It will be appreciated that this method is illustrative of the invention and that other monomers, parameters, reaction conditions, and the like can also be used. A dispersion of the acrylic polymer stabilizer in a hydrocarbon solvent such as ISOPAR E (isoparaffinic hydrocarbon solvent available from ExxonMobil Chemical) is prepared. To this dispersion is added a mixture of additional acrylic polymer stabilizer and ethylenically unsaturated monomer at elevated temperature, such as 90° C. over a period of time such as 180 minutes. In some embodiments, the weight ratio of the acrylic polymer stabilizer to the etheylenically unsaturated monomer (i.e., the "core" monomers) is from 10:100 to 100:10, such as from 20:100 to 100:20.

A chain transfer agent, such as N-octylmercaptan, may be added with the acrylic polymer stabilizer, ethylenically unsaturated monomer, and/or seed stage stabilized seed polymer, at about 0.5 to 5.0 weight %, such as 1.0 to 2.0 weight %. The ethylenically unsaturated monomer(s) are described above. A radical initiator, such as azobis-2,2'-(2-methylbutyronitrile), can be added to the reaction mixture over approximately the same time period. The initiator is chosen so that it will induce radical polymerization of the core monomers at the selected reaction temperature. The radical initiator may comprise 0.2% to 5.0%, such as 0.5% to 2.0%, of the composition of the reactants by weight. After the addition of the acrylic stabilizer, the ethylenically unsaturated monomer(s), and the radical initiator is complete, the resulting mixture may be held at the reaction temperature for an extended period of time, such as 120 minutes, during which additional initiator may be added to ensure complete conversion of the monomers. Progress of the reaction may be monitored by solids measurement, or by gas chromatography. After the process is complete, the resulting preliminary non-aqueous dispersion may be from about 15% to 70%, such as from 20% to 65%, 22% to 62%, or 32% to 52%, weight solids.

A polyester stabilizer may also be present in the reaction mixture used to prepare the polymeric microparticles. The polyester stabilizer may be present in the dispersion of the acrylic polymer stabilizer in a hydrocarbon solvent, and/or the mixture of additional acrylic polymer stabilizer and ethylenically unsaturated monomer. The polyester stabilizer may comprise 1% to 99%, such as 5% to 50%, or 10% to 40% by weight of the total acrylic polymer stabilizer and polyester stabilizer composition. In some embodiments, the weight ratio of the sum of acrylic polymer stabilizer and polyester stabilizer to the ethylenically unsaturated ("core") monomers is from 10:100 to 100:10, such as from 20:100 to 100:20.

Also, an aliphatic polyester stabilized seed polymer may be present in the reaction mixture used to prepare the polymeric microparticles In the case of an aliphatic polyester stabilized seed polymer, a preliminary non-aqueous dispersion is first prepared: A mixture of the polyester stabilizer and seed monomer(s), such as an ethylenically unsaturated monomer, can be added to a hydrocarbon solvent such as ISOPAR E (isoparaffinic hydrocarbon solvent available from ExxonMobil Chemical) at an elevated temperature such as 90° C., over a period of time such as over 30 minutes. The ratio of polyester stabilizer to seed monomer can be from 0.2:1.0 to 4.0:1.0 such as from 0.5:1.0 to 2.0:1.0. A radical initiator, such as azobis-2,2'-(2-methylbutyronitrile), can be added to the reaction mixture over approximately the same time period. The initiator is chosen so that it will induce radical polymerization of the seed monomer at the selected reaction temperature. The radical initiator may comprise 1% to 10%, such as 4% to 8%, of the composition of the reactants by weight. During the addition, the mixture can be agitated at a suitable speed, such as from 200 to 300 rpm. After the addition of the polyester stabilizer, the seed monomer(s), and the radical initiator is complete, the resulting mixture can be from about 2% to 12%, such as from about 4% to 10%, weight solids. The mixture can be held at the same elevated temperature for an additional period of time, such as 30 minutes. The preceding process provides the aliphatic polyester stabilized seed polymer. At this point, the mixture can be isolated and stored for use at a later time. Alternatively, the mixture can be used immediately.

To the mixture of the aliphatic polyester stabilized seed polymer can be added a mixture of acrylic polymer stabilizer and an ethylenically unsaturated monomer at an elevated temperature, such as 90° C., over a period of time, such as over 180 minutes. In some embodiments, additional polyester stabilizer, such as 0.5 to 5.0 weight %, or 1.0 to 2.0 weight %, based on total weight of the monomers used in preparing the non-aqueous dispersion may be added with the mixture of the acrylic polymer stabilizer and the ethylenically unsaturated monomer. In some embodiments, the weight ratio of the seed polymer to the "core" monomers is from 1:100 to 20:100, such as from 5:100 to 15:100.

The acrylic stabilizer will generally be compatible with the continuous phase, or solvent, of the preliminary non-aqueous dispersion. In certain embodiments, the solubility parameters of the acrylic stabilizer and the continuous phase may be similar, such as a difference of 3 units or less, or 2.5 units or less; if the difference is more than 3 units, then the acrylic stabilizer may not be soluble in the continuous phase. In certain embodiments, the van Krevelen solubility parameter of the acrylic stabilizer at 298 K is 17 to 28 units, such as 17.5 to 20 units or 18 to 19 units. As used in reference to solubility parameter. "units" refers to MPa^0.5. In the case of a copolymer, the solubility parameter can be calculated from the weighted average of the van Krevelen solubility parameter of the homopolymers derived from the individual monomers. The van Krevelen solubility parameter for a homopolymer is calculated using Synthia implemented in Material Studio 5.0, available from Accelrys, Inc., San Diego, Calif. Solubility parameters for solvents can be obtained from "Hansen solubility parameters: a user's handbook", Charles M. Hansen, CRC Press, Inc., Boca Raton, Fla., 2007. The solubility parameter of a mixture of solvents can be calculated from the weighted average of the solubility parameter of the individual solvents.

In certain embodiments, the solubility parameter of the continuous phase in the preliminary non-aqueous dispersion is lower than that of the core monomers, such as a difference of 3 units or greater, or 3.8 units or greater; if there is less than a 3 unit difference the core monomers may be too soluble in the continuous phase and the microparticles of the dispersion may not readily form.

In some embodiments, additional polyester stabilizer and/or a chain transfer agent may be added with the acrylic polymer stabilizer, ethylenically unsaturated monomer, and, if used, the solvent, as described above.

The preliminary non-aqueous dispersion obtained as described above can be converted into the composition of the present invention by first diluting the preliminary non-aqueous dispersion with a relatively non-volatile polymerizable monomer, then removing the more volatile solvent via distillation. "Relatively non-volatile" indicates that the boiling point difference between the solvent and polymerizable monomer is sufficient enough to allow for convenient separation via distillation, as is known in the art. For example, a non-aqueous dispersion suspended in a mixture of heptane, toluene and isopropanol can be diluted with enough diethylene glycol bis(allyl carbonate) to provide the required concentration of non-aqueous dispersion in polymerizable monomer, for example 500 wt % relative to the non-aqueous dispersion. The heptane, toluene, and isopropanol solvents can then be removed from the non-aqueous dispersion under optionally reduced pressure and optionally with heat. The pressure and temperature are not particularly limited. Additional polymerizable monomer can be added after the solvent has been removed.

In the making of an optical article, the polymerizable non-aqueous dispersion may be introduced into a mold of any desired shape at a temperature and for a time to form a polymerizate. After mixing of the components of the polymerizable non-aqueous dispersion to form a reaction mixture it is introduced, usually by injection, into a mold. The temperature of the reaction mixture as it is introduced into the mold is not particularly limited, but can range from room temperature up to 130° C. The mold may have any shape desired for the final product as noted above. It is typically a lens mold; often a mold for an ophthalmic lens. The molded article may then be released from the mold.

The reaction mixture is held in the mold at a temperature and for a time sufficient to essentially cure the reaction mixture and form a molded optical article. For example, the thermal cure cycle used to cure the polymerizable non-aqueous dispersions of the present invention, in some embodiments such as addition polymerization, involves heating the polymerizable non-aqueous dispersion from room temperature up to 50° C. to 150° C., over a period of from 2 hours to 48 hours, or from 55° C. up to 90° C. or 100° C. over a period of from 12 to 24 hours, or from 65° C. up to 115° C. or 125° C. over a period of from 12 to 24 hours. For other polymerizable species, typical curing conditions may range from 50° F. to 475° F. (10° C. to 246° C.) for 1 to 30 minutes, such as 265° to 350° F. (129° to 175° C.) for 20 to 30 minutes.

Polymerization of the compositions of the present invention results in the formation of a polymerizate, which can be made in the form of a shaped article, such as by rolling to form a sheet or by molding. Polymerizates obtained from polymerization of the polymerizable compositions of the present invention are solid, and in some embodiments, transparent.

The polymerizable compositions described above may be used to prepare optical articles demonstrating high refractive indices, reduced yellowing, and reduced haze, and or increased color stability in the presence of ultraviolet radiation compared to optical articles prepared from polymerizable compositions that do not contain the pigment component.

Polymerizates prepared from the polymerizable compositions of the present invention can be used to form solid articles such as optical element(s) or device(s). As used herein the term "optical" means pertaining to or associated with light and/or vision. For example, the optical element or device can comprise ophthalmic elements and devices, and sheet products such as display elements and devices, windows, mirrors, and/or active and passive liquid crystal cell elements and devices. As used herein the term "ophthalmic" means pertaining to or associated with the eye and vision. Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors. As used herein the term "display" means the visible or machine-readable representation of information in words, numbers, symbols, designs or drawings. Non-limiting examples of display elements and devices include screens, monitors, and security elements, such as security marks. As used herein the term "window" means an aperture adapted to permit the transmission of radiation there-through. Non-limiting examples of windows include automotive and aircraft transparencies, filters, shutters, and optical switches. As used herein the term "mirror" means a surface that specularly reflects a large fraction of incident light.

Polymerizates prepared from the polymerizable compositions of the present invention, with some embodiments, have: a refractive index of at least 1.57, or at least 1.58, or at least 1.59; an ABBE number of at least 30, or at least 33, or at least 35; and a Fischer microhardness value of at least 50 N/mm$^2$, or at least 70 N/mm$^2$, or at least 90N/mm$^2$. With some embodiments, polymerizates prepared from the polymerizable compositions of the present invention have an initial (zero second) Barcol hardness of at least 1, or at least 10, or at least 20. The refractive index, ABBE number, and Fischer Hardness values can be determined in accordance with art-recognized methods. With some embodiments: refractive index values ($n_e^{20}$) and ABBE numbers are determined using a Metricon Model 2010 Prism Coupler, Thin Film Thickness/Refractive Index Measurement System, in accordance with the manufacturer's Operation and Maintenance Guide; and Fischer Hardness values are determined in accordance with ISO 14577 using a Fischer Technologies H100C Microhardness Measurement System.

Optical articles prepared by the process of the present invention demonstrate high yield, high transparency, very low haze, low flow lines and low inclusions. Adjustments to the composition of the polymeric particles within the non-aqueous dispersion or the polymerizable continuous phase which contains the non-aqueous dispersion can be used to adjust transparency, haze, etc. of the optical articles, as is known in the art. For example, higher mismatching between the refractive index of the particles within the non-aqueous dispersion and the continuous phase will lead to higher haze and lower transparency, as is known in the art. Likewise, lower mismatching leads to lower haze and higher transparency. Moreover, the optical articles prepared by the method of the present invention demonstrate improved impact resistance as well as shrinkage resistance during polymerization, compared to optical articles prepared from the polymerizable component (a) alone; i.e., that are not combined with the polymeric microparticles (b) in a non-aqueous dispersion.

The present invention is more particularly described in the following examples, which are intended to be illustrative only, since numerous modifications and variations therein will be apparent to those skilled in the art. Unless otherwise specified, all parts and all percentages are by weight.

EXAMPLES

Example 1

An aliphatic polyester intermediate for a polyester stabilizer was prepared as follows using the ingredients in Table 1:

TABLE 1

| Ingredients | Parts by Weight |
|---|---|
| Charge #1 | |
| 12-Hydroxystearic acid | 2304 |
| Toluene | 411 |
| Charge #2 | |
| Methane Sulfonic Acid | 4.6 |
| Charge #3 | |
| Glycidyl Methacrylate | 279 |
| t-Butyl Catechol | 2.3 |
| N,N-Dimethyl-dodecylamine | 9.2 |
| Toluene | 104 |

Charge #1 was added to a 5-liter, 4-necked flask equipped with a Dean-Stark trap. The reaction mixture was heated to reflux under a Nitrogen blanket and Charge #2 was added. After approximately 100 grams water was collected, a sample was taken to measure acid value. The reaction mixture was cooled to 130° C. when the acid value fell between 29 and 30. The reaction mixture was then air sparged and Charge #3 was added. The reaction was held at 130° C. until the acid value was at or below 0.4. The solution thus obtained had an acid value of 0.4 mg KOH per gram of resin (measured by titration); Mw 5973 and Mn 3595 (measured by gel permeation chromatography using polystyrene standards); and a free glycidyl methacrylate content of 2.63 weight % (measured by gas chromatography).

Example 2

A polyester stabilizer was prepared as follows using the ingredients in Table 2:

TABLE 2

| Ingredients | Parts by Weight |
|---|---|
| Charge #1 | |
| Butyl Acetate | 545 |
| Charge #2 | |
| Polyester Intermediate of Example 1 | 775 |
| Methyl Methacrylate | 588 |

TABLE 2-continued

| Ingredients | Parts by Weight |
|---|---|
| Glycidyl Methacrylate | 56 |
| Xylene | 474 |
| Charge #3 | |
| Butyl Acetate | 418 |
| VAZO ® 64[1] | 25.8 |
| Charge #4 | |
| Butyl Acetate | 75 |
| Charge #5 | |
| Methyacrylic Acid | 11.4 |
| t-Butyl Catechol | 0.16 |
| N,N-Dimethyldodecylamine | 1.5 |

[1] 2,2'-azobis(2-methylpropionitrile), available from DuPont.

Charge #1 was added into a 5-liter, 4-necked flask and heated to 99° C. under a nitrogen blanket. At 99° C., Charges #2 and #3 were added into the reaction flask over 3 hours followed by a rinse using Charge #4. The reaction mixture was then held at 99° C. for 4 hours. Charge #5 was added when the hold was complete, and the reaction mixture was heated to 135° C. and held an additional 4 hours. The polyester stabilizer thus obtained had an acid value of 0.14 mg KOH per gram of resin (measured by titration); Mw 18434 and Mn 2616 (measured by gel permeation chromatography using polystyrene standards); and a free monomer content of methyl methacrylate of 1.47 weight % and glycidyl methacrylate of 0.13 weight % (measured by gas chromatography).

Example 3

An acrylic polymer stabilizer was prepared as follows using the ingredients in Table 3:

TABLE 3

| Ingredients | Parts by weight |
|---|---|
| Charge #1 | |
| Butyl Acetate | 389.92 |
| Charge #2 | |
| LUPEROX ® 26[2] | 39.86 |
| Butanol | 86.65 |
| Charge #3 | |
| 2-Ethylhexyl methacrylate | 259.95 |
| Glycidyl Methacrylate | 259.95 |
| Isobutyl methacrylate | 250.41 |
| Hydroxybutyl acrylate | 96.18 |
| Charge #4 | |
| VAZO ® 52[3] | 4.33 |
| Butyl Acetate | 52 |
| Charge #5 | |
| 4-Methoxyphenol | 0.43 |
| Dimethyl Ethanolamine | 0.78 |
| Charge #6 | |
| Acrylic Acid | 7.8 |
| Butyl Acetate | 26 |

[2] t-Butyl Peroctoate, available from Arkema, Inc.
[3] 2,2-azobis(2,4-dimethyl valeronitrile), available from DuPont.

Charge #1 was added into a 3-liter, 4-necked flask equipped with a motor-driven stir blade, a thermocouple, a nitrogen inlet, and a water-cooled condenser. The reaction mixture was heated to reflux (approximately 125° C.). Charges #2 and #3 were added dropwise via addition funnels over 4 hours while the reaction mixture continued to reflux. After the addition was complete, the reaction was held at reflux for 1 hour, then cooled to 110° C., at which time Charge #4 was added over 10 min. The reaction mixture was held at 110° C. for 1 hour. After the 1-hour hold, the nitrogen blanket was switched to an air sparge. After sparging for 30 min, Charge #5 was added to the reaction flask followed by Charge #6. The reaction mixture was held at 110° C. for 2 hours. The acrylic polymer solution thus obtained had an acid value 0.3 mg KOH per gram of resin (measured by titration); Mw 7911 and Mn 2321 (measured by gel permeation chromatography using polystyrene standards); and a total free monomer content of <0.50% (measured by gas chromatography).

Example 4

A Non-Aqueous Dispersion (NAD) 4 was prepared as detailed below using the materials described in Table 4:

TABLE 4

| Ingredients | Parts by Weight |
|---|---|
| Charge #1 | |
| Stabilizer of Example 2 | 7.59 |
| Stabilizer of Example 3 | 28.66 |
| Heptane | 125.26 |
| Toluene | 141.75 |
| Isopropanol | 18.98 |
| Charge #2 | |
| Stabilizer of Example 2 | 30.37 |
| Stabilizer of Example 3 | 114.44 |
| Styrene | 18.98 |
| Methyl Methacrylate | 45.55 |
| Hydroxyethyl methacrylate | 18.98 |
| Hydroxyethyl acrylate | 94.90 |
| 1,6-Hexanediol Diacrylate | 4.0 |
| Charge #3 | |
| VAZO ® 67[4] | 2.84 |
| Toluene | 50.85 |
| Charge #4 | |
| VAZO 67 | 0.95 |
| Toluene | 17.0 |

[4] 2,2'-Azobis(2-methylbutyronitrile), available from DuPont.

Charge #1 was added into a 2-liter, 4-necked flask equipped with a motor-driven steel stir blade, a thermocouple, a nitrogen inlet, and a water-cooled condenser. The reaction mixture was heated to 90° C., by a mantle controlled by the thermocouple via a temperature feedback control device. Charges #2 and #3 were added via addition funnel over 4 hours, and then the reaction mixture was held at 90° C. for 1 hour. After the hold, Charge #4 was added over 30 min, and then the reaction mixture was held at 90° C. for 1 hour. The non-aqueous dispersion thus obtained had a volume average particle size of 192 nm (measured by Zetasizer).

Example 5

A Non-Aqueous Dispersion was prepared as follows:

TABLE 5

| Ingredients | Parts by Weight |
| --- | --- |
| NAD of Example 4 | 200 |
| CR-39[5] | 150 |

[5]An allyl diglycol carbonate available from PPG Industries, Inc.

The ingredients in Table 5 were combined in a 500 ml, 4-necked flask equipped with a motor-driven steel stir blade, a thermocouple, a nitrogen inlet, and a water-cooled condenser. The reaction mixture was heated to 70° C., and the volatile solvents in the reaction mixture were removed under 20-25 inch Hg vacuum pressure over 5-6 hours.

Example 6

A Non-Aqueous Dispersion was prepared as follows:

TABLE 6

| Ingredients | Parts by Weight |
| --- | --- |
| NAD of Example 4 | 200 |
| CR-607[6] | 200 |

[6]Diallyl carbonate of aliphatic alcohols, available from PPG Industries, Inc.

The ingredients in Table 6 were combined in a 500 ml, 4-necked flask equipped with a motor-driven steel stir blade, a thermocouple, a nitrogen inlet, and a water-cooled condenser. The reaction mixture was heated to 70° C., and the volatile solvents in the reaction mixture were removed under 20-25 inch Hg vacuum pressure over 5-6 hours.

Examples 7-12

Into a glass jar was added the NAD of Example 5, CR-39 monomer, and benzoyl peroxide (3 pph) according to Table 7. The resulting mixtures were then stirred with a magnetic stirrer until fully homogeneous. Viscous samples also required intermittent sonication to help solubilize the BPO. The samples were then degassed under vacuum, poured into a 3 mm glass mold, and baked according to bake cycle A or B. Properties of the cast sheets were then determined according to Table 1. Haze was determined using a HunterLab UltraScan PRO spectrophotometer in Total Transmission mode. The path length for sheet samples is equal to the sample thickness.

TABLE 7

| Example | NAD of Example 5 (pph) | CR-39 (pph) | bake cycle | Fisher micro-hardness | haze | impact to break, in-lbs (number of samples tested) |
| --- | --- | --- | --- | --- | --- | --- |
| 7 | 0 | 97 | A | 105 | 3.6 | 2.1 (4) |
| 8 | 32.3 | 64.7 | A | 113 | 4.3 | 3.25 (4) |
| 9 | 48.5 | 48.5 | A | 115 | 5.3 | 3.25 (4) |
| 10 | 97 | 0 | A | 109 | 4.6 | 4.1 (4) |
| 11 | 0 | 97 | B | | | 1.8 (9) |
| 12 | 97 | 0 | B | | | 2.7 (14) |

Bake Cycle A - ramp from 71° C. to 77° C. over 8 hours, the ramp to 79° C. over 2 hours, then ramp to 82° C. over 2 hours, then ramp to 95° C. over 3 hours, then hold at 95° C. for 1 hour, then ramp to 85° C. over 2 hours.
Bake cycle B - ramp from 25° C. to 110° C. over 24 hours.

Example 13

Into a glass jar was added the NAD of Example 6 (97 pph) and benzoyl peroxide (3 pph). The resulting mixture was then stirred with a magnetic stirrer until fully homogeneous. The sample was then degassed under vacuum, poured into a 3 mm glass mold, and baked according to bake cycle B as described in the above Examples. A cured transparent sheet was obtained, but was too soft to resist impact.

Example 14

Synthesis of Diallyl Itaconate

The following ingredients were charged to a 1 liter reaction flask equipped with a reflux condenser, nitrogen blanket, Dean-Stark trap, temperature recorder, and heating mantel: 131.0 grams of itaconic acid, 174.2 grams of allyl alcohol, 160 grams of cyclohexane, and 4.8 grams of methanesulfonic acid. The mixture was heated to reflux, and the water by-product was collected in the Dean-Stark trap for a period of approximately 20 hours. The resulting product mixture was cooled to room temperature, washed with a dilute aqueous solution of sodium bicarbonate, and dried over a mixture of anhydrous sodium carbonate, anhydrous sodium sulfate, and activated carbon. It was filtered, concentrated to dryness, passed through a small amount of silica gel, and vacuum dried to remove volatiles. The desired product was obtained in 95.5% yield, with 99% purity based upon GC analysis, and the chemical structure was confirmed by NMR analysis.

Example 15

Into a glass jar was added CR-39 monomer (76.2 pph), the dispersion from Example 5 (9.5 pph), diallyl itaconate product of Example 14 (9.5 phr), and NS-60 (a peroxide initiator purchased from AKZO Nobel) (4.8 phr). The resulting mixture was stirred with a magnetic stirrer until fully homogeneous, poured into a 2 mm glass mold, and then baked according to Bake Cycle C (ramp from 44 to 58° C. over 10 hours, then ramp from 58 to 70° C. over 4.5 hours, then ramp from 70 to 95° C. over 2 hours, then ramp from 95 to 80° C. over 2 hours). A cured transparent sheet was obtained. The Fisher microhardness was 90, and haze was 1.1%.

The present invention has been described with reference to specific details of particular embodiments thereof. It is not intended that such details be regarded as limitations upon the scope of the invention except insofar as and to the extent that they are included in the accompanying claims.

What is claimed is:

1. A polymerizable non-aqueous dispersion, wherein the non-aqueous dispersion comprises:
    (a) a polymerizable component as a continuous phase, wherein the polymerizable component (a) comprises at least one monomer, oligomer, and/or prepolymer having two or more allyl groups, and at least 95 percent by weight of said continuous phase comprises said polymerizable component; and
    (b) polymeric microparticles dispersed in the continuous phase, wherein the microparticles comprise a dispersion polymerization reaction product prepared from a reaction mixture comprising an ethylenically unsaturated monomer, an acrylic polymer stabilizer, and an aliphatic polyester stabilizer, and wherein said polymeric microparticles have a particle size of less than 500 nm,
wherein the polymerizable component (a) further comprises at least one (meth)acrylate functional monomer and diethylene glycol bis(allylcarbonate).

2. The polymerizable non-aqueous dispersion of claim 1, wherein the monomer having two or more allyl groups comprises diethylene glycol bis(allylcarbonate).

3. The polymerizable non-aqueous dispersion of claim 1, wherein the non-aqueous dispersion further comprises a radical initiator.

4. The polymerizable non-aqueous dispersion of claim 3, wherein the radical initiator comprises a peroxy initiator.

5. The polymerizable non-aqueous dispersion of claim 1, wherein the polymerizable component (a) further comprises:
(a) at least one first (meth)acrylate functional monomer represented by the following Formula (I),

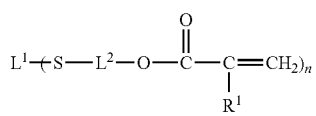

wherein,
$L^1$ is selected from, a multivalent optionally substituted hydrocarbyl group optionally interrupted with at least one of —C(O)—, —S—, —O—, and combinations thereof, and a divalent linking group represented by the following Formula (A),

wherein Y is O or S,
$L^2$ is independently for each n a divalent optionally substituted hydrocarbyl group optionally interrupted with at least one of —O— and —S—,
$R^1$ is independently selected for each n from hydrogen and methyl, and n is from 2 to 6;
(b) optionally, a polymerization moderator; and
(c) optionally, at least one monoethylenically unsaturated monomer.

6. The polymerizable non-aqueous dispersion of claim 1, wherein the reaction mixture further comprises an aliphatic polyester stabilized seed polymer.

7. The polymerizable non-aqueous dispersion of claim 1, wherein the aliphatic polyester has a carbon to oxygen ratio of 4:1 to 20:1.

8. The polymerizable non-aqueous dispersion of claim 1, wherein the aliphatic polyester comprises poly-12-hydroxystearic acid.

9. The polymerizable non-aqueous dispersion of claim 1, wherein the polyester has a weight average molecular weight of 10,000 to 30,000.

10. The polymerizable non-aqueous dispersion of claim 6, wherein the aliphatic polyester has a carbon to oxygen ratio of 4:1 to 20:1.

11. The polymerizable non-aqueous dispersion of claim 6, wherein the aliphatic polyester comprises poly-12-hydroxystearic acid.

12. The polymerizable non-aqueous dispersion of claim 6, wherein the polyester has a weight average molecular weight of 10,000 to 30,000.

13. The polymerizable non-aqueous dispersion of claim 1, wherein the acrylic polymer stabilizer comprises a nonlinear acrylic polymer.

14. The polymerizable non-aqueous dispersion of claim 1, wherein at least 90 percent of the microparticles have an average particle size of up to 300 nanometers.

15. The polymerizable non-aqueous dispersion of claim 14, wherein at least 90 percent of the microparticles have an average particle size of 180 nm or less.

16. The polymerizable non-aqueous dispersion of claim 1, wherein the continuous phase is essentially free of non-polymerizable volatile organic compounds.

17. An optical article comprising a polymer prepared from the polymerizable non-aqueous dispersion of claim 1.

18. The optical article of claim 17, wherein the optical article is a lens, sheet product, scratch resistant lens, or scratch resistant sheet.

19. A polymerizable non-aqueous dispersion, wherein the non-aqueous dispersion comprises:
(a) a polymerizable component as a continuous phase, wherein the polymerizable component (a) comprises two or more ethylenic unsaturations; and
(b) polymeric microparticles dispersed in the continuous phase, wherein the microparticles comprise a dispersion polymerization reaction product prepared from a reaction mixture comprising an ethylenically unsaturated monomer, and an acrylic polymer stabilizer, and wherein said polymeric microparticles have a particle size of less than 500 nm,
wherein the polymerizable component (a) comprises:
(a) at least one first (meth)acrylate functional monomer represented by the following Formula (I),

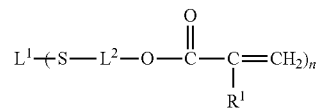

wherein,
$L^1$ is selected from, a multivalent optionally substituted hydrocarbyl group optionally interrupted with at least one of —C(O)—, —S—, —O—, and combinations thereof, and a divalent linking group represented by the following Formula (A),

wherein Y is O or S,
$L^2$ is independently for each n a divalent optionally substituted hydrocarbyl group optionally interrupted with at least one of —O— and —S—,
$R^1$ is independently selected for each n from hydrogen and methyl, and n is from 2 to 6;
(b) optionally, a polymerization moderator; and
(c) optionally, at least one monoethylenically unsaturated monomer.

* * * * *